(12) United States Patent
Compton et al.

(10) Patent No.: US 6,553,361 B1
(45) Date of Patent: Apr. 22, 2003

(54) KNOWLEDGE BASED SYSTEM

(75) Inventors: Paul Justin Lloyd Compton, Randwick (AU); Glenn Andrew Edwards, Nedlands (AU); Leslie Lazarus, St Ives (AU); Lindsay Andrew Peters, Eastwood (AU); Michael Bonnell Harries, Newtown (AU)

(73) Assignee: Pacific Knowledge Systems Pty Ltd., Australian Technology Park (AU)

( * ) Notice: Subject to any disclaimer, the term of this patent is extended or adjusted under 35 U.S.C. 154(b) by 93 days.

(21) Appl. No.: 09/618,860

(22) Filed: Jul. 18, 2000

Related U.S. Application Data
(60) Provisional application No. 60/144,501, filed on Jul. 19, 1999.

(51) Int. Cl.[7] .............................................. G06F 17/00

(52) U.S. Cl. ......................................... 706/47; 707/102

(58) Field of Search .............................. 706/46, 45, 47; 707/102

(56) References Cited

PUBLICATIONS

Hendra Suryanto et al; The Automatic Compression of Multiple Classification Ripple Down Rule knowledge Based Systems: Preliminary Experiments; Apr. 1999; IEEE; 0–7803–5578; 203–206.*

Compton, P. J. and R. Jansen (1989). "A philosophical basis for knowledge acquisition." 3rd European Knowledge Acquisition for Knowledge–Based Systems Workshop, Paris: 75–89.

Compton, P., G. Edwards, B. Kang, L. Lazarus, R. Malor, T. Menzies, P. Preston, A. Srinivasan and C. Sammut (1991). Ripple down rules: possibilities and limitations. 6th Bannf AAAI Knowledge Acquisition for Knowledge Based Systems Workshop, Banff.

Preton, P., G. Edwards and P. Compton (1994). A 2000 Rule Expert System Without a Knowledge Engineer. Proceedings of the 8th AAAI–Sponsored Banff Knowledge Acquisition for Knowledge–Based Systems Workshop, Banff, Canada.

(List continued on next page.)

Primary Examiner—John A. Follansbee
Assistant Examiner—Joseph P. Hirl
(74) Attorney, Agent, or Firm—Davis & Bujold, P.L.L.C.

(57) ABSTRACT

A ripple down rules knowledge based system for generating an output conclusion in response to an input case, the system including a database arranged to receive and store a plurality of conclusions and a plurality of rules, each new conclusion added to the database being associated with a previously stored conclusion as a refinement of the previously stored conclusion and each new conclusion added to the database being associated with a rule, input mechanism for facilitating input of a case, and output mechanism for outputting at least one previously stored conclusion in response to the input case, the system being arranged such that when multiple identical conclusions are returned by the system in response to an input case and a new conclusion associated with the input case is added as a refinement of the identical conclusions, a list of cornerstone conflict cases associated with all of the identical conclusions is generated, and the system being arranged to receive an input rule indicative of a difference between the input case and the cornerstone conflict cases, and to associate the input rule with each of the identical conclusions.

66 Claims, 13 Drawing Sheets

OTHER PUBLICATIONS

Preston, P., E. Edwards, P. Compton and D. Litkouhi (1994). An expert System Interpreter for Time Course Data with Refinement in Context, AAAI Spring Symposium: Artificial Intelligence in Medicine.

Compton, P., B. Kang, P. Preston and M. Mulholland (1993). Knowledge Acquisition without Analysis. Knowledge Acquisition for Knowledge–Based Systems. Lecture Notes in AI (723(.N. Aussenac, G. Boy, B. Gaineset al. Berlin, Springer Verlag:278–299.

Kang, B., P. Compton and P. Preston (1995). Multiple Classification Ripple Down Rules: Evaluation and Possibilities. Proceedings of the $9^{th}$ AAAI–Sponsored Banff Knowledge Acquisition for Knowledge–Based Systems Workshop, Banff, Canada, University of Calgary.

Compton, P., Z. Ramadan, P. Preston, T. Le–Gia, V. Chellen and M. Mullholland (1998). A trade–off between domain knowledge and problem–solving method power. $11^{th}$ Banff Knowledge Acquisition for Knowledge–Based Systems Workshop, Banff, SRDG Publications, University of Calgary.

Compton, P., P. Preston, G. Edwards and B. Kang (1996). Knowledge based systems that have some idea of their limits. Proceedings of the $10^{th}$ AAAI–Sponsored Banff Knowledge Acquisition for Knowledge–Based Sytems Workshop, Banff, Canada, University of Calgary.

G. Beydoun, A Hoffman, Building Problem Solvers Based on Search Control Knowledge, In Proceedings of Eleventh Workshop on Knowledge Acquisition, Modeling Management, Banff, Canada 1998.

* cited by examiner

KNOWLEDGE BASED SYSTEM

This application claims benefit of provisional appln. Ser. No. 60/144,501 filed Jul. 19, 1999.

FIELD OF THE INVENTION

The present invention relates to a knowledge based system and, in particular, to a knowledge based system which is implemented by a computing system.

BACKGROUND OF THE INVENTION

It is known to provide a knowledge based system for carrying out a task such as generating an output conclusion based on an input series of attributes. Such systems are useful because once the necessary knowledge is stored in the system, it is possible for a non-expert to solve a task without the need to consult an expert. However, a disadvantage with the majority of such knowledge based systems is that it is necessary to acquire the knowledge from the expert and utilise a knowledge engineer to correctly store and organise the acquired knowledge in the knowledge based system.

In order to overcome difficulties building and maintaining this type of system, an alternative knowledge based system referred to as a Ripple Down Rules System (RDR) has been devised.

Ripple Down Rules is a process for building and maintaining knowledge based systems which utilises the normal process of knowledge acquisition. The process was conceived as a result of a realisation that when asked why a certain conclusion applies in a given situation, an expert generally does not explain how the conclusion was reached but, rather, gives a justification for why that the conclusion is correct. This realisation is critical since for each case presented to an expert, the expert provides and justifies a conclusion in a particular and specific context. The conclusion may not be appropriate for other contexts that the expert did not consider. In other words, the normal process of knowledge acquisition involves continual refinement and correction.

In an RDR system, therefore, knowledge is acquired by accumulating conclusions made by experts and associating with each changed conclusion a justification for the change of conclusion.

An RDR system is structured in a way which may be represented in the format of a tree, with each node of the tree being associated with a particular conclusion. In addition, each child node of a preceding parent node is associated with a conclusion which is a refinement of the conclusion associated with the parent node. The RDR system is constructed on a case by case basis.

An example of a known RDR knowledge based system (10) is shown in FIGS. 1–4 of the accompanying drawings.

In FIGS. 1–4, the RDR system is shown at different stages of construction. The system is constructed by presenting "cases" to the knowledge base, a "case" being a set of attributes which are to be used in determining an appropriate conclusion.

Initially, the system contains a single "null" first node 12 as shown in FIG. 1.

Irrespective of the attributes of the input case, the first node 12 is always satisfied and when executed returns the conclusion "null".

In relation to RDR systems a "rule" is a set of criteria which define the justification for the difference between the case associated with a child node and the case associated with its parent node. A rule may include one or several "conditions" which define the justification.

In operation of the system, a node is said to be "satisfied" when all rules between the node and the first node are satisfied. A node is said to be "executed" and the conclusion associated with the node returned when all rules between the node and the first node 12 are satisfied and no rules between the node any of its child nodes are satisfied.

A first case including the attributes "barks", "four legs", "warm blooded" and live born" is presented to the knowledge base and the system returns a conclusion "null". The domain expert disagrees with the conclusion. In order to provide a correct conclusion for the case, the domain expert indicates to the system that the expert disagrees with the conclusion and the system adds a second node 14, as shown in FIG. 2. The second node 14 is a child node of the first node 12. The expert supplies a conclusion to be associated with the second node 14 and, in this example, the conclusion is chosen to be "dog". The expert is also required to provide a justification for the difference between is the given conclusion "null" and the chosen conclusion "dog". In this example, the justification is chosen to be "four legs=true" and this is added between the first node 12 and the second node 14 as a rule.

The case on which the second node 14 is based is stored in the knowledge base as a cornerstone case associated with the second node 14.

A second case including the attributes "lives in water" and "gills" is presented to the knowledge base and the system returns a conclusion "null" since the first node 12 is satisfied but its child node is not satisfied.

The domain expert disagrees with this conclusion. In order to provide a correct conclusion for the case, the domain expert indicates to the system that the expert disagrees with the conclusion and the system adds a third node 16, as shown in FIG. 3. The third node 16 is a child node of the executed first node 12. The expert supplies a conclusion to be associated with the third node 16 and, in this example, the conclusion is chosen to be "goldfish". The expert is also required to provide a justification for the difference between the given conclusion "null" and the chosen conclusion "goldfish". In this example, the justification is chosen to be "lives in water" and this is added to the link between the first node 12 and the third node 16 as a rule.

The case on which the third node 16 is based is stored in the knowledge base as a cornerstone case associated with the third node 16.

A third case including the attributes "four legs", "whiskers", "warm blooded" and "live born" is presented to the knowledge base, and the system returns a conclusion "dog", since the case presented to the knowledge base satisfies the condition "four legs=true" and the second node 14 does not have any child nodes at this stage. The domain expert disagrees with this conclusion. In order to provide a correct conclusion for the case, the domain expert indicates to the system that the expert disagrees with the conclusion and the system adds a fourth node 18, as shown in FIG. 4. The fourth node 18 is a child node of the executed second node 14. The expert supplies a conclusion to be associated with the fourth node 18 and, in this example, the conclusion is chosen to be "cat". The expert is also required to provide a justification for the difference between the present case and the case associated with the given conclusion "dog". In this example, the justification is chosen to be "barks=false" and this is added to the link between the second node 14 and the fourth node 18 as a rule.

The case on which the fourth node 18 is based is stored in the knowledge base as a cornerstone case associated with the fourth node 18.

It will be understood from the diagrams in FIGS. 1 to 4 that each new node that is added to the knowledge base is a node which is linked by a rule to a previous node, the previous node being a parent node and the new node being a child node. It will also be understood that the new node is associated with a conclusion which is a refinement of the conclusion associated with its parent node.

This type of Ripple Down Rules system allows only a single path through the tree to be followed at any one time, and therefore only one conclusion to be returned for each case presented to the knowledge base. Such an RDR system is known as Single Classification RDR (SC-RDR).

A flow diagram showing a method of construction of the Single Classification RDR system described above is shown in FIG. 5. The method includes the steps of presenting a case to a knowledge base 19, interpreting the case by the knowledge base and outputting a conclusion 21, entering a decision by an expert as to whether the interpretation is correct 23, receiving expert approval if the interpretation is correct 25, adding a new node to the knowledge base if the interpretation is not correct 27, providing a new conclusion for the added node 29, and entering a condition to differentiate between the case associated with the executed node and the preset case 31.

While this type of RDR system is certainly useful, in many instances more than one important conclusion may be derivable from a case. For example, in medicine more than one condition may be appropriate for a particular patient, such as a patient who has diabetes and is also pregnant. In order to accommodate multiple conclusions, an alternative RDR system known as Multiple Classification RDR (MC-RDR) has been developed.

With MC-RDR, all nodes which are satisfied are executed and all associated conclusions returned. An example of an MC-RDR system will be described in relation to FIGS. 6 and 7 which show an MC-RDR system 20 having a similar structure to the SC-RDR system shown in FIG. 4 but with an additional fifth node 22.

With this system, if a case including the attributes "four legs", "lives in water" and "lungs" is presented to the knowledge base, the conclusions "dog" and "axolotl" will be returned. The first conclusion is returned because the rule between the second node 14 and the first node 12 is satisfied and the rule linking the second node 14 to the fourth node 18 is not satisfied. The second conclusion is returned because the chain of rules between the fifth node 22 and the first node 12 are also all satisfied and the fifth node 22 does not have any child nodes.

Of course, in this example, the conclusion "dog" is incorrect since dogs do not live in water.

In order to remove the conclusion "dog" for the present case, a stopping node 24 as shown in FIG. 7 is used. The stopping node 24 operates such that when the stopping node 24 is executed, no conclusion is returned by the system. In order to remove the erroneous conclusion "dog" for the present case, therefore, the stopping node 24 is added as a child node of the second node 14 and a justification is added for removing the conclusion "dog". In the present example, the justification is chosen to be "lives in water" since this distinguishes dogs from animals which live in water and are therefore clearly not dogs.

With the modified MC-RDR system in FIG. 7, the case having the attributes "four legs", "lives in water" and "lungs" would therefore now only return the conclusion axolotl, which is correct.

As a consequence of MC-RDR, whereby each cornerstone case can satisfy multiple nodes and therefore cause the system to return multiple conclusions, when a change is made to the system, for example when a new node is added, the set of conclusions for more than one cornerstone case may change. All cornerstone cases which will be affected by a change in the knowledge base, that is all cornerstones whose set of conclusions will change, are referred to as "cornerstone conflicts". In order to avoid undesired changes to the set of conclusions returned by the system, a list of all cornerstone conflicts is compiled. Each cornerstone case of the cornerstone conflict list must be handled either by adding conditions to the new node so that the new node is not executed when the cornerstone case is presented to the system, or by explicitly accepting that the new conclusion should apply to the cornerstone case.

An example of the conventional way of dealing with cornerstone conflicts arising from an MC-RCR system will now be described in relation to the MC-RDR system shown in FIGS. 6 and 7.

With this system, if a case including the attributes "four legs", "wags tail", "barks", "warm blooded" and "live-born" is presented to the knowledge base, the conclusion "dog" will be returned. In this instance, the domain expert agrees with the conclusion. However, the expert wishes the conclusion "mammal" to also be returned when this case is presented to the knowledge base.

In order to add the conclusion "mammal" for the present case, a sixth node 26 is added as shown in FIG. 8. At this stage, since no justification has been given for the difference between the present case and the "null" node, all cornerstone cases will be given the new conclusion "mammal" in addition to the associated existing conclusions. In other words, at this stage all cornerstone cases are present in the cornerstone conflict list. In this example, the expert chooses the justifications "warm blooded" and "live born". As a consequence, the cornerstone conflict list now includes only the cornerstone case corresponding to the conclusion "dog" and the cornerstone case corresponding to the conclusion "cat". However, since these two cases are both mammals, this conclusion is allowed to remain as an additional conclusion to both cornerstone cases. If, however, the expert did not want this conclusion to apply to one of these cornerstone cases, the expert would have to provide a justification in the form of an additional condition for the difference between the cornerstone case and the present case.

A flow diagram showing a method construction of the Multiple Classification RDR system described above is shown in FIG. 9. Like steps are indicated with like reference numerals. The flow diagram further identifies the method steps of generating a cornerstone conflict case for the conclusion to be modified 33, determining whether any cornerstone case is affected by the modification 35, and entering a condition to include or exclude the affected cornerstone case(s) from modification 37.

A disadvantage of known MC-RDR systems is that for some cases the system may return the same conclusion several times for different reasons. While this is of no consequence if the conclusion is correct, the user is faced with a cumbersome and time-consuming task should the conclusion require modification, since each one of the multiple conclusions has to be modified individually. For example, case A has the following attributes:

glucose=9 glucose type=fasting past (glucose type)=10 past (glucose)=timed

HcAlc=11

On presenting case A to a medical-type MC-RDR system, the system returns 3 identical conclusions "diabetic". Each conclusion is returned for different reasons, as follows:

Conclusion 1 "diabetes"

Justifications: glucose greater than 8 and glucose type= fasting.

Conclusion 2 "diabetes"

Justifications: past (glucose) greater than 8 and past (glucose type)=timed

Conclusion 3 "diabetes"

Justification: HcAlc greater than 10

With the present case A, the person associated with the case is also pregnant. As a result the correct conclusion should be "gestational diabetes".

To modify the returned conclusions "diabetes", the user must separately select each of the above three conclusions, and for each conclusion enter the new conclusion "gestational diabetes" and add condition(s) to differentiate the case A from the relevant cornerstone case(s) in the cornerstone conflict list.

This is cumbersome and time consuming.

It is also known for an MC-RDR system to include an "intermediate conclusion" which serves as an attribute in a subsequent pass of the knowledge base. For example, in FIG. 10 there is shown a MC-RDR knowledge base 28 which includes a "null" first node 30, a second node 32 corresponding to the conclusion "dog", a third node 34 corresponding to the conclusion "cat", a fourth node 36 corresponding to the conclusion "fish", and a fifth node 38 corresponding to the conclusion "Axolotl". Also provided is an intermediate node 40 corresponding to the conclusion "mammal=true".

By providing an intermediate conclusion in a knowledge based system, the size of the knowledge base is minimised, the readability of justifications is improved, the consistency of the knowledge base is improved as the conditions for the intermediate conclusion need be entered only once, and disjunctive sub-concepts can be more easily represented.

With the system shown in FIG. 10, for a given input case repeated passes of the MC-RDR knowledge base 28 are carried out so that all rules affected by conclusion values may be correctly set. In some circumstances, the knowledge base is passed for a fixed number of iterations. In other circumstances, the knowledge base may be passed until no conclusions change.

With the present example, therefore, if a case having the attributes "wags tail", "warm blooded", "live born" and "young fed milk" is presented to the knowledge base 28, after a first iteration of the knowledge base the system will return the conclusion "mammal=true". On a second iteration of the knowledge base 28, the conclusion "mammal=true" from the intermediate node 40 is added to the set of attributes of the case and the correct conclusions "dog" and "mammal=true" are returned.

However, a disadvantage of the use of intermediate conclusions and repeated iterations of the knowledge base is that multiple iterations of the knowledge base is inefficient. In addition, repeated iterations of the knowledge base runs the risk that the justification for the resulting conclusions refer to intermediate values that are in conflict with actual values to be reported for intermediates. Also, in some circumstances cycles of dependency can have the effect of preventing a stable set of conclusions from ever being reached.

A further disadvantage of existing RDR systems is that amendment of the knowledge base rules and conclusions to account for large scale changes in relevant criteria for the rules can require many changes on a case by case basis. In such situations, it can take many new cases to correct the knowledge base.

To deal with this problem, it has been proposed to allow users to directly edit the text of conclusions or to allow the users to directly edit the RDR tree. However, these approaches are problematic since the impact of any changes made directly to the tree may not necessarily be clear and the tree is not easy to interpret directly.

As a consequence, existing RDR knowledge bases have tended not to allow the user any access to directly edit any aspect of the RDR knowledge base. Modification of the knowledge base has therefore only been possible by providing new cases to the knowledge base and adding new conclusions as modifications of existing conclusions in the conventional way.

A further disadvantage of known RDR systems is that there is an assumption that a domain expert is required to verify all conclusions returned by the system. This is often impractical.

A difficulty, however, with removing verification by an expert completely is that there is a risk that some cases will be given incorrect conclusions.

In order to deal with this problem in an SC-RDR system, it has been proposed to arrange the system so that verification is necessary only when a case has been flagged as a case which is liable to be an exception, that is, a case which is likely to require addition of a modified conclusion.

The flag is generated by associating with each conclusion in the knowledge base a "prudence" profile which contains the minimum and maximum values previously seen for all attributes of all cases associated with the prudence profile. The arrangement is such that when a new case includes attributes whose values fall within the minimum and maximum prudence values, the case is not flagged as a case which is liable to be an exception. However, when a new case is presented which includes an attribute having a value which falls outside the range defined by the minimum and maximum values, the case is flagged as a case which is liable to be an exception and an indication is provided to the user that expert verification is required.

SUMMARY OF THE INVENTION

In accordance with a first aspect of the present invention, there is provided a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when a conclusion is output by the system in response to an input case and a new conclusion associated with the input case is added as a refinement of the output conclusion, the system determines whether a cornerstone case already exists which would cause output of the new conclusion and associates said determined cornerstone case with the new conclusion.

In accordance with a second aspect of the present invention, there is provided a method of constructing a ripple down rules knowledge based system for generating an output conclusion in response to an input case, said method including the steps of providing a database arranged to receive and store a plurality of conclusions and a plurality of rules, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, and arranging said system such that when a conclusion is output by the system in response to an input case and a new conclusion associated with the input case is added as a refinement of the output conclusion, the system determines whether a cornerstone case already exists which would cause output of the new conclusion and associates said determined cornerstone case with the new conclusion.

In accordance with a third aspect of the present invention, there is provided a computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when a conclusion is output by the system in response to an input case and a new conclusion associated with the input case is added as a refinement of the output conclusion, the system determines whether a cornerstone case already exists which would cause output of the new conclusion and associates said determined cornerstone case with the new conclusion.

In accordance with a fourth aspect of the present invention, there is provided a computer program arranged, when loaded into a computer, to instruct the computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when a conclusion is output by the system in response to an input case and a new conclusion associated with the input case is added as a refinement of the output conclusion, the system determines whether a cornerstone case already exists which would cause output of the new conclusion and associates said determined cornerstone case with the new conclusion.

In accordance with a fifth aspect of the present invention, there is provided a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when multiple identical conclusions are returned by the system in response to an input case and a new conclusion associated with the input case is added as a refinement of said identical conclusions, a list of cornerstone conflict cases associated with all of said identical conclusions is generated, and said system being arranged to receive an input rule indicative of a difference between the input case and the cornerstone conflict cases, and to associate the input rule with each of said identical conclusions.

Preferably, the multiple identical conclusions are displayed as a single conclusion with an indication of the number of identical conclusions returned by the system.

Preferably, the knowledge base is organised such that the knowledge base may be represented in the form of a tree having a plurality of interconnected nodes, each node of the tree corresponding to a conclusion.

In accordance with a sixth aspect of the present invention, there is provided a method of constructing a ripple down rules knowledge based system for generating an output conclusion in response to an input case, said method including the steps of providing a database arranged to receive and store a plurality of conclusions and a plurality of rules, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, arranging said system such that when multiple identical conclusions are returned by the system in response to an input case and a new conclusion associated with the input case is added as a refinement of said identical conclusions, a list of cornerstone conflict cases associated with all of said identical conclusions is generated, arranging said system to receive an input rule indicative of a difference between the input case and the cornerstone conflict cases, and associating the input rule with each of said identical conclusions.

Preferably, the method further includes the step of displaying the multiple identical conclusions as a single conclusion with an indication of the number of identical conclusions returned by the system.

In accordance with a seventh aspect of the present invention, there is provided a computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when multiple identical conclusions are returned by the system in response to an input case and a new conclusion associated with the input case is added as a refinement of said identical conclusions, a list of cornerstone conflict cases associated with all of said identical conclusions is generated, and said system being arranged to receive an input rule indicative of a difference between the input case and the cornerstone conflict cases, and to associate the input rule with each of said identical conclusions.

Preferably, the multiple identical conclusions are displayed as a single conclusion with an indication of the number of identical conclusions returned by the system.

Preferably, the knowledge base is organised such that the knowledge base may be represented in the form of a tree having a plurality of interconnected nodes, each node of the tree corresponding to a conclusion.

In accordance with a eighth aspect of the present invention, there is provided a computer program arranged, when loaded into a computer, to instruct the computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion being added to the database associated with a rule, input means for facilitating input of a case, and output means for outputting at least one previously stored conclusion in response to the input case, said system being arranged such that when multiple identical conclusions are returned by the system in response to an input case and a new conclusion associated with the input case is added as a refinement of said identical conclusions, a list of cornerstone conflict cases associated with all of said identical conclusions is generated, and said system being arranged to receive an input rule indicative of a difference between the input case and the cornerstone conflict cases, and to associate the input rule with each of said identical conclusions.

Preferably, the multiple identical conclusions are displayed as a single conclusion with an indication of the number of identical conclusions returned by the system.

Preferably, the knowledge base is organised such that the knowledge base may be represented in the form of a tree having a plurality of interconnected nodes, each node of the tree corresponding to a conclusion.

In accordance with a ninth aspect of the present invention, there is provided a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when a new conclusion identical with a previous conclusion is added to the database, simultaneous output of the new conclusion and the previous conclusion is restricted.

Preferably, the system is arranged to restrict simultaneous output of the new conclusion and the previous conclusion by identifying a previous conclusion and verifying whether the rule associated with the identified previous conclusion is satisfied by the input case.

Alternatively, the system is arranged to restrict simultaneous output of the new conclusion and the previous conclusion by identifying a previous conclusion, identifying a rule associated with the previous conclusion, generating a negated rule corresponding to said identified rule and associating said negated rule with the new conclusion.

Preferably, the system is also arranged to generate a stopping conclusion, the stopping conclusion being associated with the new conclusion and with a negated rule of said identified rule, the arrangement being such that when the previous conclusion is output, the stopping conclusion is satisfied and the new conclusion is not output.

In accordance with a tenth aspect of the present invention, there is provided a method of constructing a ripple down rules knowledge based system for generating an output conclusion in response to an input case, said method including the steps of providing a database arranged to receive and store a plurality of conclusions and a plurality of rules, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, and arranging said system such that when a new conclusion identical with a previous conclusion is added to the database, simultaneous output of the new conclusion and the previous conclusion is restricted.

Preferably, the arranging step includes the steps of identifying a previous conclusion and verifying whether the rule associated with the identified previous conclusion is satisfied by the input case.

Alternatively, the arranging step includes the steps of identifying a previous conclusion, identifying a rule associated with the previous conclusion, generating a negated rule corresponding to said identified rule, and associating said negated rule with the new conclusion.

Preferably, the arranging step further includes the steps of generating a stopping conclusion, and associating the stopping conclusion with the new conclusion and with a negated rule of said identified rule, the arrangement being such that when the previous conclusion is output, the stopping conclusion is satisfied and the new conclusion is not output.

In accordance with a eleventh aspect of the present invention, there is provided a computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when a new conclusion identical with a previous conclusion is added to the database, simultaneous output of the new conclusion and the previous conclusion is restricted.

Preferably, said system is arranged to restrict simultaneous return of the new conclusion and the previous conclusion by identifying a previous conclusion and verifying whether the rule associated with the identified previous conclusion is satisfied by the input case.

Alternatively, said system is arranged to restrict simultaneous return of the new conclusion and the previous conclusion by identifying a previous conclusion, identifying a rule associated with the previous conclusion, generating a negated rule corresponding to said identified rule, and associated said negated rule with the new conclusion.

Preferably, said system is arranged to generate a stopping conclusion, the stopping conclusion being associated with the new conclusion and with a negated rule of said identified rule, the arrangement being such that when the previous conclusion is returned, the stopping conclusion is satisfied and the new conclusion is not returned.

In accordance with an twelfth aspect of the present invention, there is provided a computer program arranged, when loaded into a computer, to instruct the computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when a new conclusion identical with a previous conclusion is added to the database, simultaneous output of the new conclusion and the previous conclusion is restricted.

Preferably, the system is arranged to restrict simultaneous output of the new conclusion and the previous conclusion by identifying a previous conclusion, identifying a rule associated with the previous conclusion, generating a negated rule corresponding to said identified rule, and associated said negated rule with the new conclusion.

Alternatively, the system is arranged to restrict simultaneous output of the new conclusion and the previous conclusion by identifying a previous conclusion and verifying whether the rule associated with the identified previous conclusion is satisfied by the input case.

Preferably, the system is arranged to generate a stopping conclusion, the stopping conclusion being associated with the new conclusion and with a negated rule of said identified rule, the arrangement being such that when the previous conclusion is output, the stopping conclusion is satisfied and the new conclusion is not output.

In accordance with a thirteenth aspect of the present invention, there is provided a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, and determining means for determining a preferred order of execution of rules of the database.

Preferably, the determining means includes a dependency ordered graph of the dependency relationship between previously stored conclusions.

Preferably, cycles of dependency between different previously stored conclusions is restricted.

Preferably, the system further includes means for reorganising the structure of the knowledge base in accordance with said determined preferred order of execution of rules of the database.

In accordance with a fourteenth aspect of the present invention, there is provided a method of constructing a ripple down rules knowledge based system for generating an output conclusion in response to an input case, said method including the steps of providing a database arranged to receive and store a plurality of conclusions and a plurality of rules, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, and determining a preferred order of execution of rules of the database.

Preferably, the determining step includes the step of generating a dependency ordered graph of the dependency relationship between previously stored conclusions.

Preferably, the determining step includes the step of restricting cycles of dependency between different previously stored conclusions.

Preferably, the method further includes the step of reorganising the structure of the knowledge base in accordance with said determined preferred order of execution of rules of the database.

In accordance with an fifteenth aspect of the present invention, there is provided a computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, and means for determining a preferred order of execution of rules of the database.

Preferably, the determining means includes a dependency ordered graph of the dependency relationship between previously stored conclusions.

Preferably, cycles of dependency between different previously stored conclusions is restricted.

Preferably, the system further includes means for reorganising the structure of the knowledge base in accordance with said determined preferred order of execution of rules in the database.

In accordance with a sixteenth aspect of the present invention, there is provided a computer program arranged, when loaded into a computer, to instruct the computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, and means for determining a preferred order of execution of rules of the database.

Preferably, the determining means includes a dependency ordered graph of the dependency relationship between previously stored conclusions.

Preferably, cycles of dependency between different previously stored conclusions is restricted.

Preferably, the system further includes means for reorganising the structure of the knowledge base in accordance with said determined preferred order of execution of rules in the database.

In accordance with a seventeenth aspect of the present invention, there is provided a ripple down rules knowledge based system for carrying out an action in response to an input case, said system including a database arranged to receive and store a plurality of action instructions and a plurality of rules, each new action instruction which is added to the database being associated with a previously stored action instruction as a refinement of the previously stored action instruction and each new action instruction which is added to the database being associated with a rule, input means for facilitating input of a case, and implementation means for carrying out an action corresponding to an action instruction when said corresponding action instruction is returned by the system in response to an input case.

Preferably, the action instruction corresponds to an action such as sending an e-mail, setting a value in the database, removing a value from a conclusion, not removing a conclusion but, instead, adding another conclusion, amalgamating a set of conclusions or setting multiple conclusions.

In accordance with a eighteenth aspect of the present invention, there is provided a method of constructing a ripple down rules knowledge based system for carrying out an action in response to an input case, said method including the steps of providing a database arranged to receive and store a plurality of action instructions and a plurality of rules, associating each new action instruction which is added to the database with a previously stored action instruction as a refinement of the previously stored action instruction, associating each new action instruction which is added to the database with a rule, providing input means for facilitating input of a case, and implementing an action corresponding to an action instruction when said corresponding action instruction is returned by the system in response to an input case.

Preferably, an action instruction corresponds to an action such as sending an e-mail, setting a value in the database, removing a value from a conclusions, not removing a conclusion but, instead, adding another conclusion, amalgamating a set of conclusions or setting multiple conclusions.

In accordance with a nineteenth aspect of the present invention, there is provided a computer usable medium having computer readable program code embodied therein for causing a computer to operate in accordance with a ripple down rules knowledge based system for carrying out an action in response to an input case, said system including a database arranged to receive and store a plurality of action instructions and a plurality of rules, each new action instruction which is added to the database being associated with a previously stored action instruction as a refinement of the previously stored action instruction and each new action instruction which is added to the database being associated with a rule, input means for facilitating input of a case, and implementation means for carrying out an action corresponding to an action instruction when said corresponding action instruction is returned by the system in response to an input case.

Preferably, an action instruction corresponds to an action such as sending an e-mail, setting a value in the database, removing a value from a conclusions, not removing a conclusion but, instead, adding another conclusion, amalgamating a set of conclusions or setting multiple conclusions.

In accordance with a twentieth aspect of the present invention, there is provided a computer program arranged, when loaded into a computer, to instruct the computer to operate in accordance with a ripple down rules knowledge based system for carrying out an action in response to an input case, said system including a database arranged to receive and store a plurality of action instructions and a plurality of rules, each new action instruction which is added to the database being associated with a previously stored action instruction as a refinement of the previously stored action instruction and each new action instruction which is added to the database being associated with a rule, input means for facilitating input of a case, and implementation means for carrying out an action corresponding to an action instruction when said corresponding action instruction is returned by the system in response to an input case.

Preferably, an action instruction corresponds to an action such as sending an e-mail, setting a value in the database, removing a value from a conclusions, not removing a conclusion but, instead, adding another conclusion, amalgamating a set of conclusions or setting multiple conclusions.

In accordance with a twenty-first aspect of the present invention, there is provided a knowledge based system for generating an output conclusion in response to an input case, said system including a database arranged to receive and store a plurality of conclusions and a plurality of rules, each rule having at least one condition, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, and means for facilitating direct editing by a user of conclusions, rules and conditions stored in the database, said system being arranged such that when a conclusion, rule or condition is changed by a user, a list of cornerstone conflict cases affected by the changed conclusion, rule or condition is generated, and said system being arranged to receive at least one input rule to distinguish between cornerstone cases in relation to which the change should apply and cornerstone cases in relation to which the change should not apply.

In accordance with a twenty-second aspect of the present invention, there is provided a method of constructing a knowledge based system for generating an output conclusion in response to an input case, said method including the steps of providing a database arranged to receive and store a plurality of conclusions and a plurality of rules, each rule having at least one condition, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, facilitating direct editing by a user of conclusions, rules and conditions stored in the database, arranging said system such that when a conclusion, rule or condition is changed by a user, a list of cornerstone conflict cases affected by the changed conclusion, rule or condition is generated, and arranging said system to receive at least one input rule to distinguish between cornerstone cases in relation to which the change should apply and cornerstone cases in relation to which the change should not apply.

In accordance with a twenty-third aspect of the present invention, there is provided computer usable medium having computer readable program code embodied therein for causing a computer to instruct the computer to operate in accordance with a ripple down rules knowledge based system for generating an output conclusion in response to an input case, said system including a database arranged to receive and store a plurality of conclusions and a plurality of rules, each rule having at least one condition, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, and means for facilitating direct editing by a user of conclusions, rules and conditions stored in the database, said system being arranged such that when a conclusion, rule or condition is changed by a user, a list of cornerstone conflict cases affected by the changed conclusion, rule or condition is generated, and said system being arranged to receive at least one input rule to distinguish between cornerstone cases in relation to which the change should apply and cornerstone cases in relation to which the change should not apply.

In accordance with a twenty-fourth aspect of the present invention, there is provided a computer program arranged, when loaded into a computer, to instruct the computer to operate in accordance with a ripple down rules knowledge based system for generating an output conclusion in response to an input case, said system including a database arranged to receive and store a plurality of conclusions and a plurality of rules, each rule having at least one condition, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, and means for facilitating direct editing by a user of conclusions, rules and conditions stored in the database, said system being arranged such that when a conclusion, rule or condition is changed by a user, a list of cornerstone conflict cases affected by the changed conclusion, rule or condition is generated, and said system being arranged to receive at least one input rule to distinguish between cornerstone cases in relation to which the change should apply and cornerstone cases in relation to which the change should not apply.

In accordance with a twenty-fifth aspect of the present invention, there is provided a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to an input case, means for generating a prudence profile, means for generating a prudence identifier using the prudence profile, said prudence identifier being indicative of whether said output previously stored conclusion is likely to be incorrect for the input case, and means for generating a profile maturity value indicative of the likely accuracy of the prudence identifier.

Preferably, the profile maturity value is indicative of the number of cases encountered by the prudence profile.

Preferably, the profile maturity value is indicative of the proportion of cases correctly identified by the prudence profile as resulting in incorrect conclusions.

Preferably, the attributes to be tracked in the prudence profile are selectable by a user.

Preferably, the prudence identifier includes a prudence rating, said prudence rating being based on the proportion by which the range of said prudence profile has been exceeded (R), the proportion of times that the prudence profile has correctly identified an exception (E), the proportion of relevant profiles that flag a given exception (Q), and/or the number of times that a profile has been updated (N).

Preferably, the prudence rating is defined by the formula $$aQ\sum_{i=1}^{i=n} (bR_i + cE_i + dN_i).$$

Preferably, the system further includes means for resetting the maturity value to zero when a new conclusion is added to the database and the prudence profile did not indicate that the output conclusion was likely to be incorrect.

Preferably, the system further includes resetting means responsive to a user for resetting to zero the prudence profile associated with an attribute of an input case when a new conclusion is added to the database and the rule associated with the new conclusion includes said attribute and no other attribute.

Preferably, the resetting means is arranged to reset to zero all prudence profiles associated with the attribute.

Preferably, the system further includes function generating means for generating a prudence function when a new conclusion is added to the database and the rule associated with the new conclusion includes more than one attribute, the prudence function serving to generate a dummy attribute based on said more than one attribute, said dummy attribute being subsequently used to determine the prudence identifier.

Preferably, the prudence function is a subtractive function or an additive function.

Preferably, each said more than one attribute is normalised.

In accordance with a twenty-sixth aspect of the present invention, there is provided a method of predicting the accuracy of a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to an input case, said method including the steps of generating a prudence profile, generating a prudence identifier using the prudence profile, said prudence identifier being indicative of whether said output previously stored conclusion is likely to be incorrect for the input case, and generating a profile maturity value indicative of the likely accuracy of the prudence identifier.

Preferably, the profile maturity value is indicative of the number of cases encountered by the prudence profile.

Preferably, the profile maturity value is indicative of the proportion of cases correctly identified by the prudence profile as resulting in incorrect conclusions.

Preferably, the attributes to be tracked in the prudence profile are selectable by a user.

Preferably, the prudence identifier includes a prudence rating, said prudence rating being based on the proportion by which the range of said prudence profile has been exceeded (R), the proportion of times that the prudence profile has correctly identified an exception (E), the proportion of relevant profiles that flag a given exception (Q), and/or the number of times that a profile has been updated (N).

Preferably, the prudence rating is defined by the formula:

$$aQ\sum_{i=1}^{i=n}(bR_i+cE_i+dN_i).$$

Preferably, the method further includes the step of resetting the maturity value to zero when a new conclusion is added to the database and the prudence profile did not indicate that the output conclusion was likely to be incorrect.

Preferably, the method further includes the step of resetting to zero the prudence profile associated with an attribute of an input case when a new conclusion is added to the database and the rule associated with the new conclusion includes said attributes and no other attribute.

Preferably, the resetting step includes the step of resetting to zero all prudence profiles associated with the attribute.

Preferably, the method further includes the step of generating a prudence function when a new conclusion is added to the database and the rule associated with the new conclusion includes more than one attribute, the prudence function serving to generate a dummy attribute based on said more than one attribute, said dummy attribute being subsequently used to determine the prudence identifier.

Preferably, the prudence function is a subtractive function or an additive function.

Preferably, each said more than one attribute is normalised.

In accordance with a twenty-seventh aspect of the present invention, there is provided computer usable medium having computer readable program code embodied therein for causing a computer to instruct the computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to an input case, means for generating a prudence profile, means for generating a prudence identifier using the prudence profile, said prudence identifier being indicative of whether said output previously stored conclusion is likely to be incorrect for the input case, and means for generating a profile maturity value indicative of the likely accuracy of the prudence identifier.

Preferably, the profile maturity value is indicative of the number of cases encountered by the prudence profile.

Preferably, the profile maturity value is indicative of the proportion of cases correctly identified by the prudence profile as resulting in incorrect conclusions.

Preferably, the attributes to be tracked in the prudence profile are selectable by a user.

Preferably, the prudence identifier includes a prudence rating, said prudence rating being based on the proportion by which the range of said is prudence profile has been exceeded (R), the proportion of times that the prudence profile has correctly identified an exception (E), the proportion of relevant profiles that flag a given exception (Q), and/or the number of times that a profile has been updated (N).

Preferably, the prudence rating is defined: by the formula:

$$aQ\sum_{i=1}^{i=n}(bR_i+cE_i+dN_i).$$

Preferably, the system further includes means for resetting the maturity value to zero when a new conclusion is added to the database and the prudence profile did not indicate that the output conclusion was likely to be incorrect.

Preferably, the system further includes resetting means responsive to a user for resetting to zero the prudence profile associated with an attribute of an input case when a new conclusion is added to the database and the rule associated with the new conclusion includes said attribute and no other attribute.

Preferably, the resetting means is arranged to reset to zero all prudence profiles associated with the attribute.

Preferably, the system further includes function generating means for generating a prudence function when a new conclusion is added to the database and the rule associated with the new conclusion includes more than one attribute, the prudence function serving to generate a dummy attribute based on said more than one attribute, said dummy attribute being subsequently used to determine the prudence identifier.

Preferably, the prudence function is a subtractive function or an additive function.

Preferably, each said more than one attribute is normalised.

In accordance with a twenty-eighth aspect of the present invention, there is provided a computer program arranged, when loaded into a computer, to instruct the computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to an input case, means for generating a prudence profile, means for generating a prudence identifier using the prudence profile, said prudence identifier being indicative of whether said output previously stored conclusion is likely to be incorrect for the input case, and means for generating a profile maturity value indicative of the likely accuracy of the prudence identifier.

Preferably, the profile maturity value is indicative of the number of cases encountered by the prudence profile.

Preferably, the profile maturity value is indicative of the proportion of cases correctly identified by the prudence profile as resulting in incorrect conclusions.

Preferably, the attributes to be tracked in the prudence profile are selectable by a user.

Preferably, the prudence identifier includes a prudence rating, said prudence rating being based on the proportion by which the range of said prudence profile has been exceeded (R), the proportion of times that the prudence profile has correctly identified an exception (E), the proportion of relevant profiles that flag a given exception (Q), and/or the number of times that a profile has been updated (N).

Preferably, the prudence rating is defined by the formula:

$$aQ\sum_{i=1}^{i=n}(bR_i + cE_i + dN_i).$$

Preferably, the system further includes means for resetting the maturity value to zero when a new conclusion is added to the database and the prudence profile did not indicate that the output conclusion was likely to be incorrect.

Preferably, the system further includes resetting means responsive to a user for resetting to zero the prudence profile associated with an attribute of an input case when a new conclusion is added to the database and the rule associated with the new conclusion includes said attribute and no other attribute.

Preferably, the resetting means is arranged to reset to zero all prudence profiles associated with the attribute.

Preferably, the system further includes function generating means for generating a prudence function when a new conclusion is added to the database and the rule associated with the new conclusion includes more than one attribute, the prudence function serving to generate a dummy attribute based on said more than one attribute, said dummy attribute being subsequently used to determine the prudence identifier.

Preferably, the prudence function is a subtractive function or an additive function.

Preferably, each said more than one attribute is normalised.

In accordance with a twenty-ninth aspect of the present invention, there is provided a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, generating means for generating a statistical value indicative of conclusions previously output by said system, and selecting means for selecting a percentage value indicative of the proportion of subsequent input cases to be presented for verification.

Preferably, the statistical value is indicative of the number of times an output conclusion was incorrect.

In accordance with a thirtieth aspect of the present invention, there is provided a method of constructing a ripple down rules knowledge based system for generating an output conclusion in response to an input case, said method including the steps of providing a database arranged to receive and store a plurality of conclusions and a plurality of rules, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, generating a statistical value indicative of conclusions previously output by said system, and selecting a percentage value indicative of the proportion of subsequent input cases to be presented for verification.

Preferably, the statistical value is indicative of the number of times an output conclusion was incorrect.

In accordance with a thirty-first aspect of the present invention, there is a computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, generating means for generating a statistical value indicative of conclusions previously output by said system, and selecting means for selecting a percentage value indicative of the proportion of subsequent input cases to be presented for verification.

Preferably, the statistical value is indicative of the number of times an output conclusion was incorrect.

In accordance with the thirty-second aspect of the present invention, there is provided a computer program arranged, when loaded into a computer, to instruct the computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, generating means for generating a statistical value indicative of conclusions previously output by said system, and selecting means for selecting a percentage value indicative of the proportion of subsequent input cases to be presented for verification.

Preferably, the statistical value is indicative of the number of times an output conclusion was incorrect.

DESCRIPTION OF THE FIGURES

The present invention will now be described, by way of example only, with reference to the accompanying drawings, in which.

DETAILED DESCRIPTION OF THE INVENTION

Figure 1:
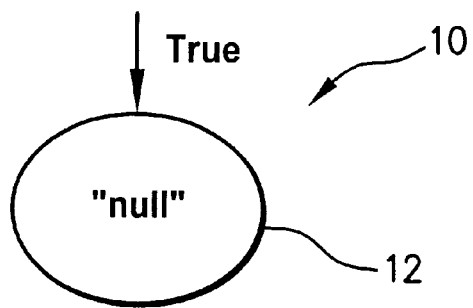
FIG. 1 is a diagrammatic representation of a prior art single classification RDR knowledge based system prior to construction.
Figure 2:
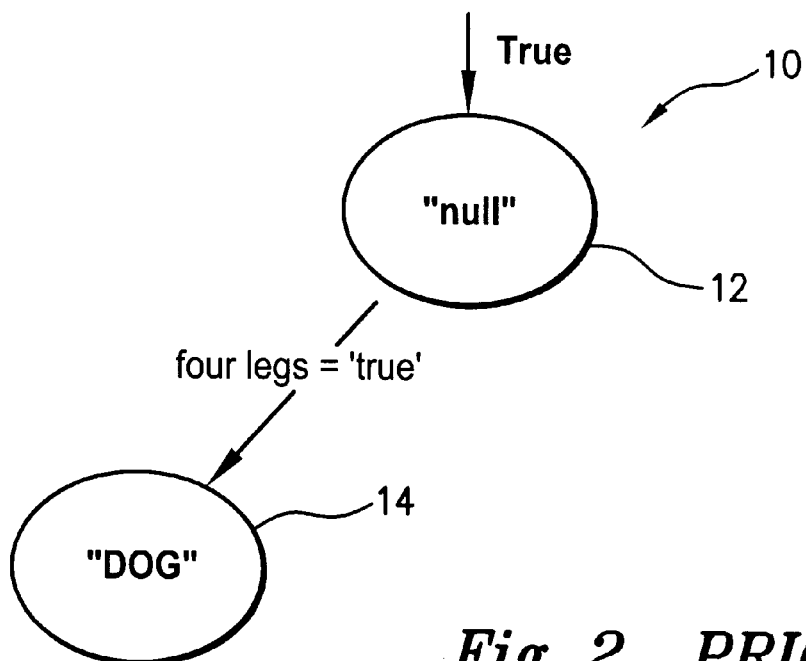
FIGS. 2 to 4 are diagrammatic representations of the prior art RDR system shown in FIG. 1 showing different stages of construction.
Figure 3:
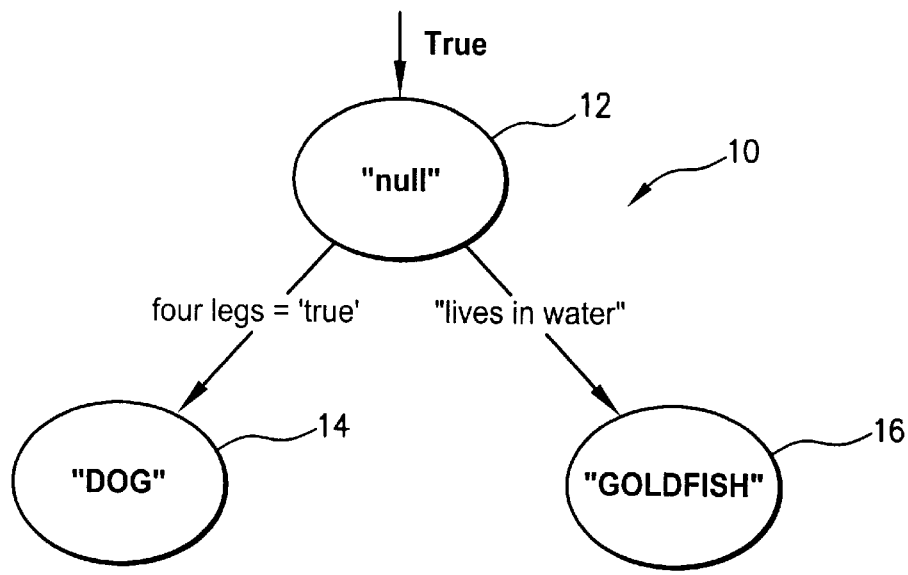
Figure 4:
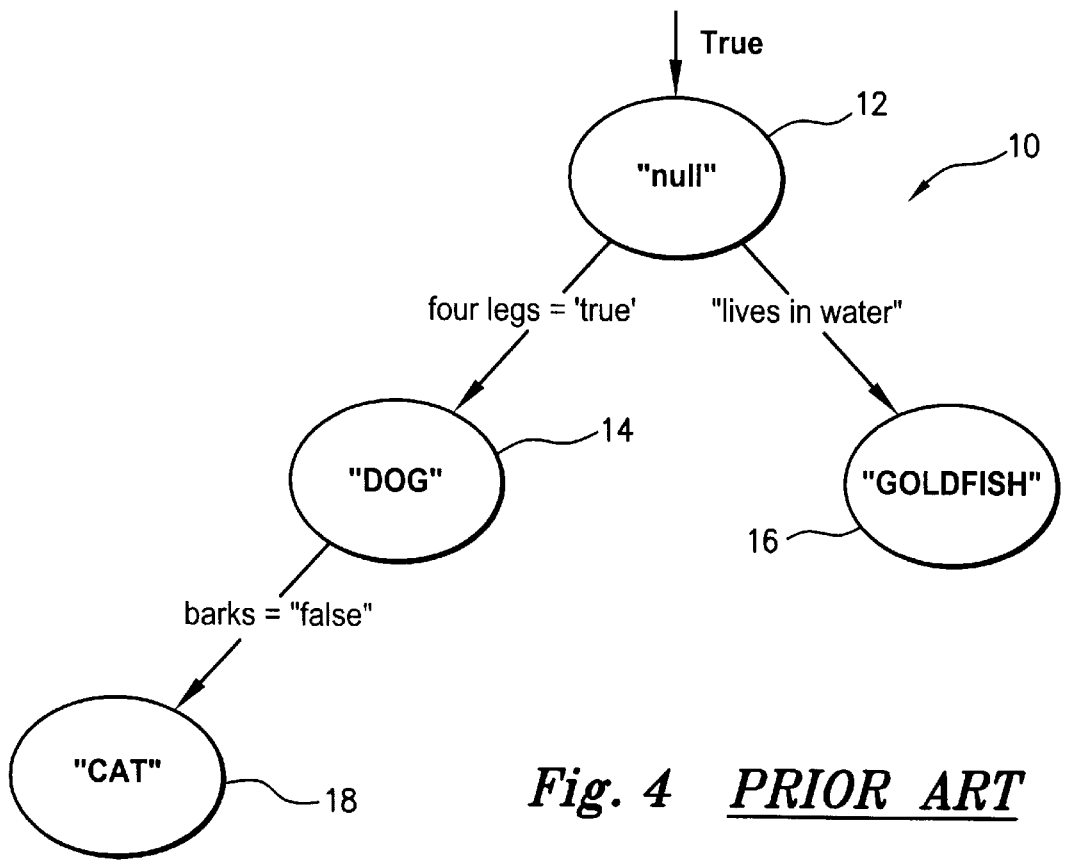
Figure 5:
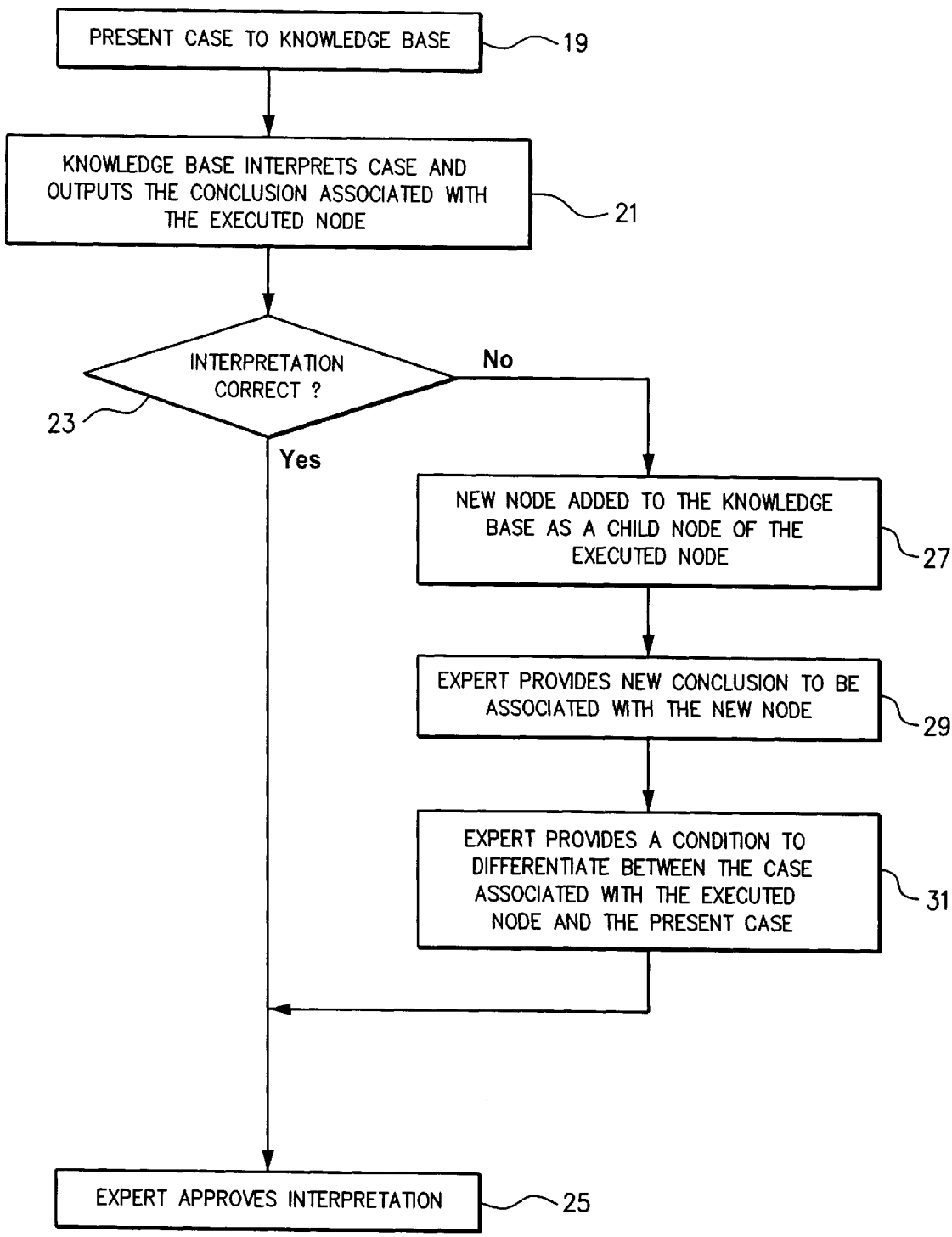
FIG. 5 is a flow diagram showing construction of the prior art RDR system shown in FIGS. 1 to 4.
Figure 6:
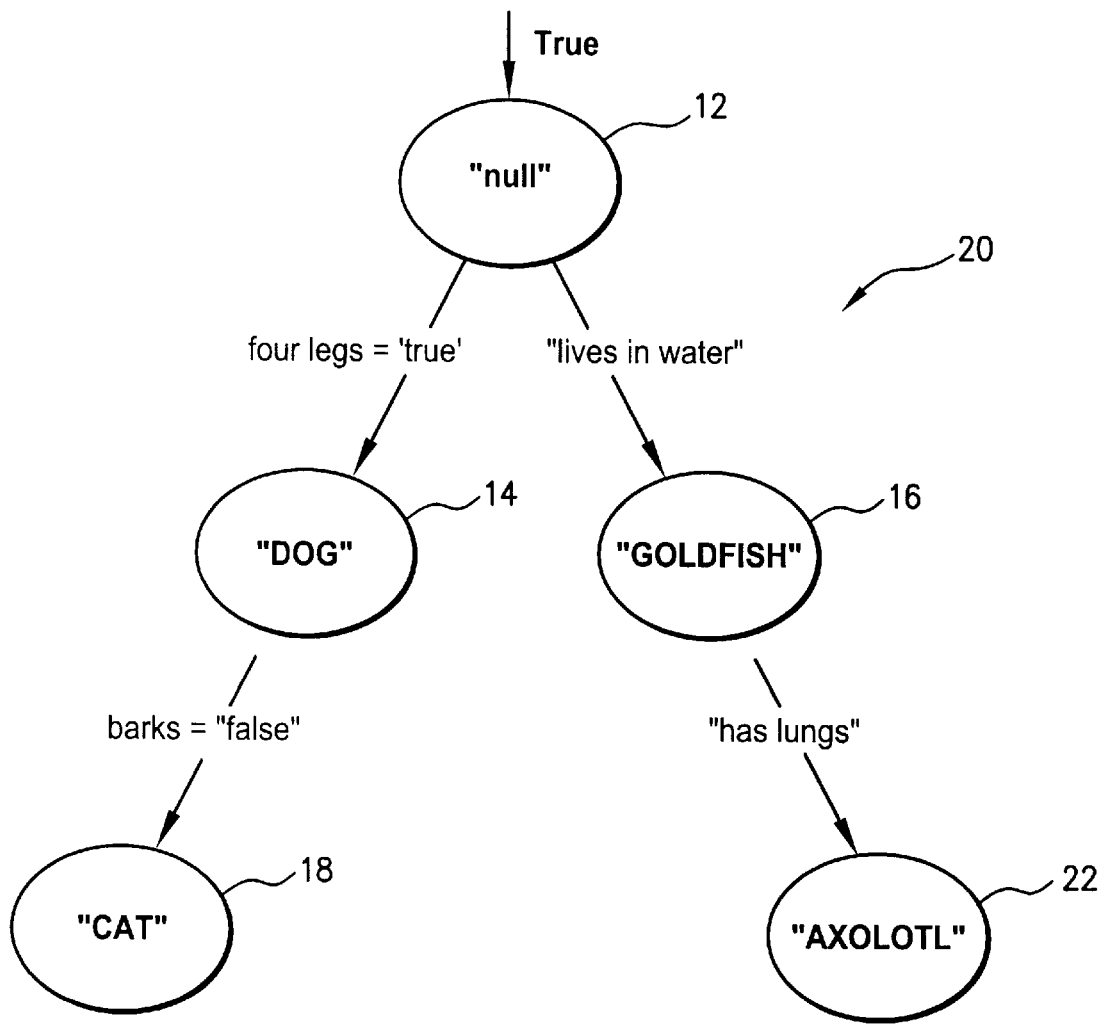
FIG. 6 is a diagrammatic representation of a prior art multiple classification RDR knowledge based system.
Figure 7:
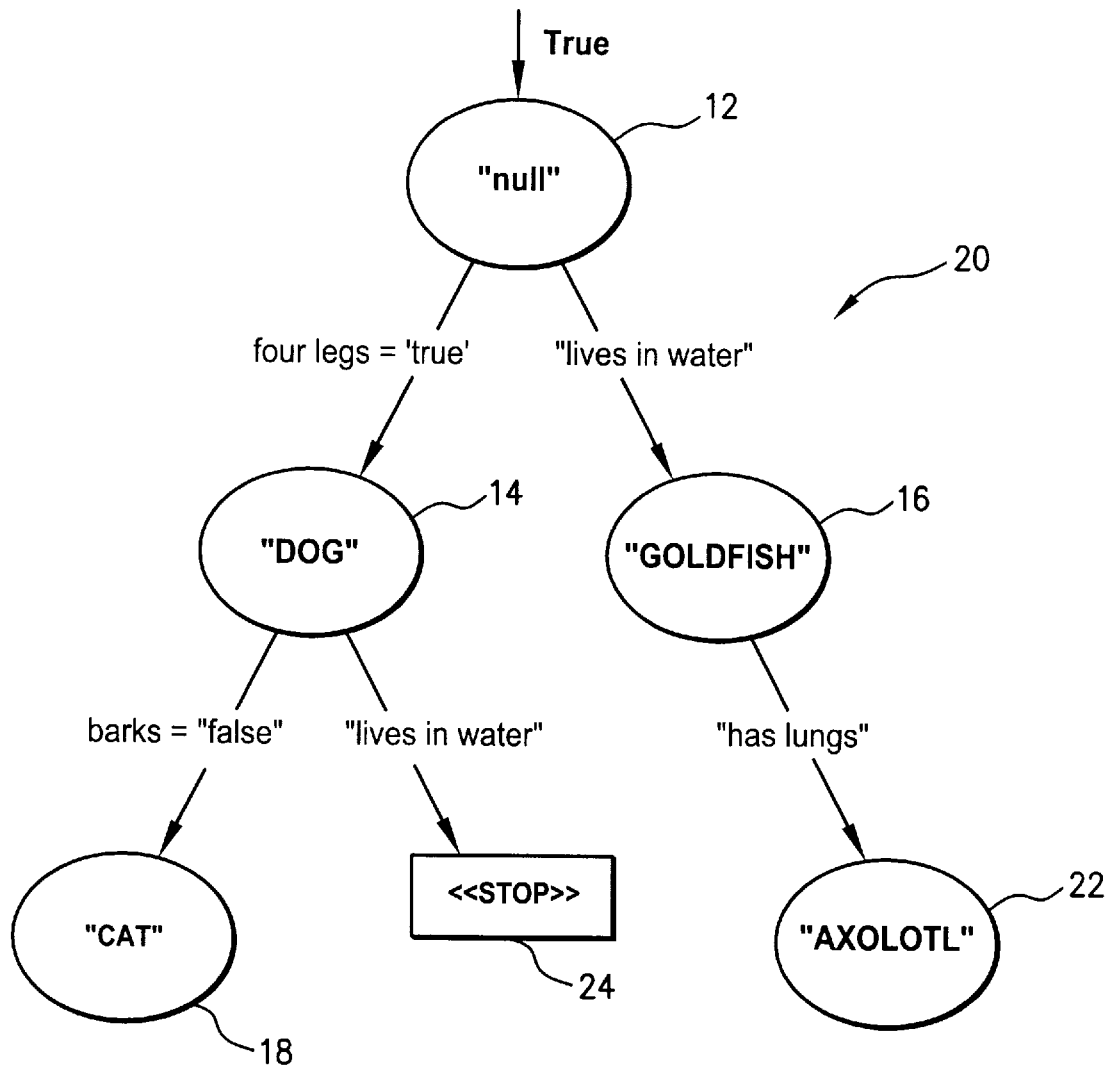
FIG. 7 is a diagrammatic representation of the system shown in FIG. 6 with a stopping node added to remove an erroneous conclusion.
Figure 8:
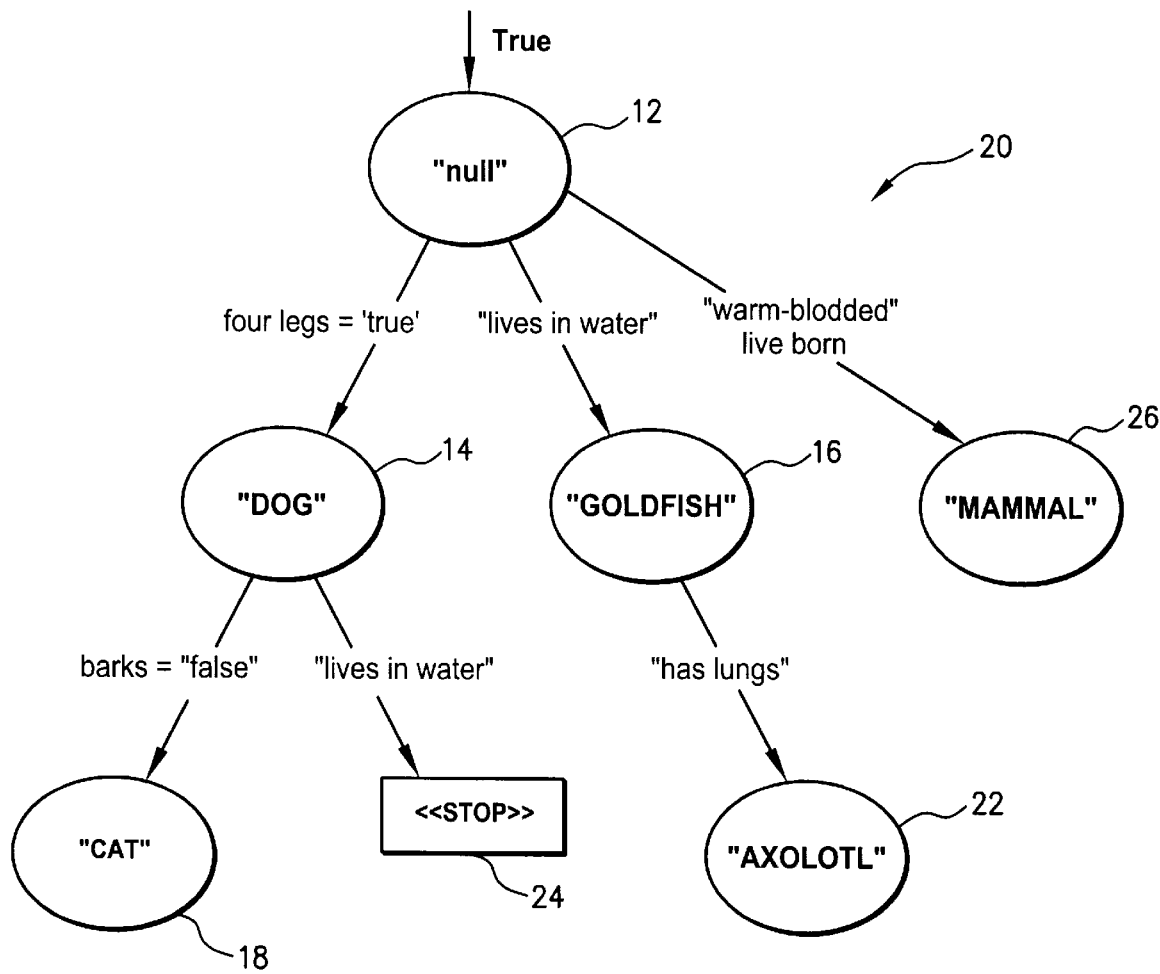
FIG. 8 is a diagrammatic representation of the system shown in FIG. 7 with an additional child node added.
Figure 9:
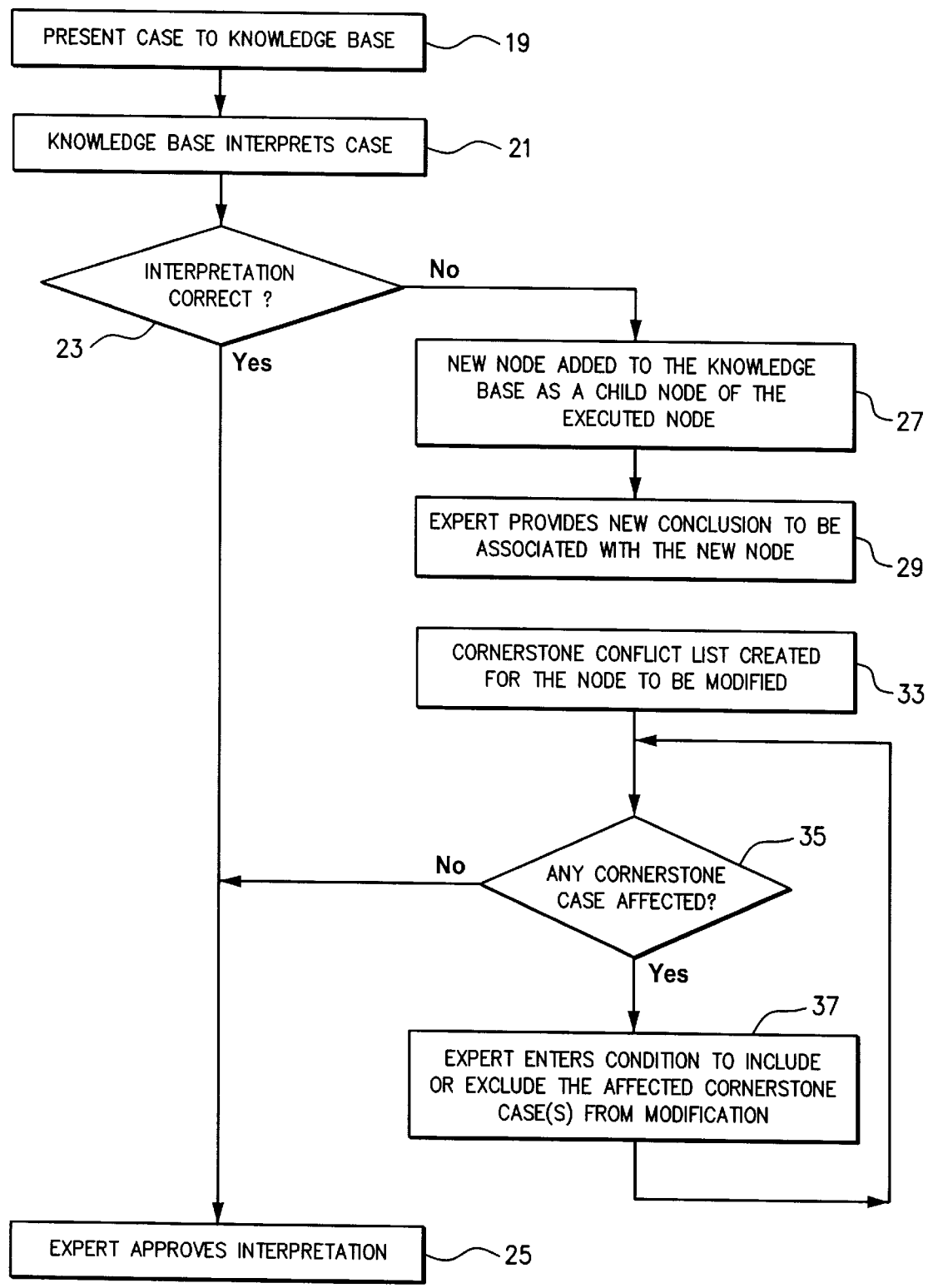
FIG. 9 is a flow diagram showing construction of the prior art RDR system shown in FIGS. 6 to 8.
Figure 10:
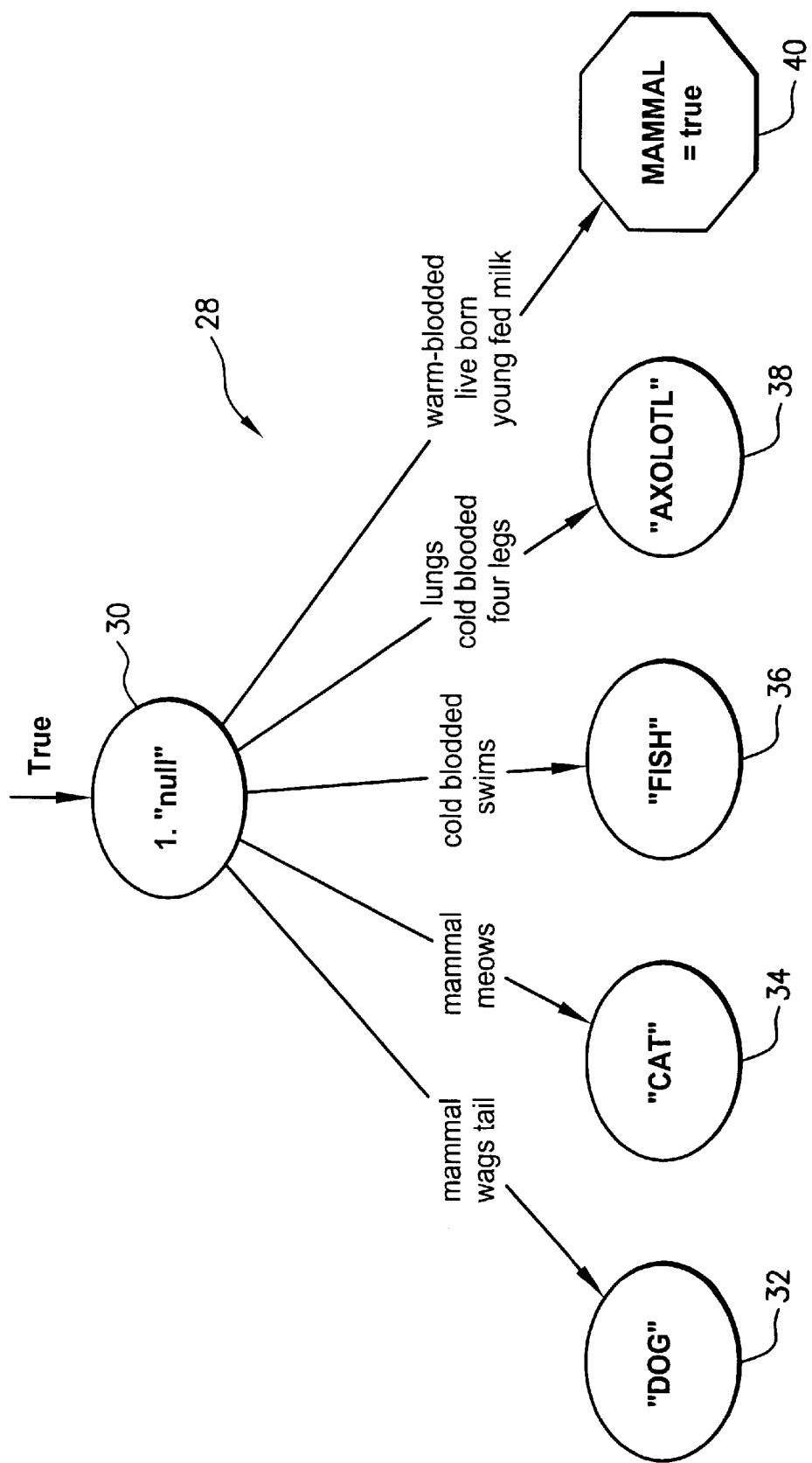
FIG. 10 is a diagrammatic representation of a prior art multiple classification RDR knowledge based system with an intermediate child node added.

In the following description of the invention, it will be understood that the invention may be implemented as hardware and/or software using an appropriate platform such as a computing system.

The RDR knowledge based system of the present invention is constructed in a similar way to the prior art RDR systems shown in FIGS. 1 to 9 in that each node of the knowledge base tree is associated with a conclusion and each child node of a parent node corresponds to a conclusion which is a refinement of the conclusion associated with the parent node. A node is "executed" and its associated conclusion returned by the system when all rules between the node and the "null" node are satisfied and none of the rules between the node and its child nodes are satisfied.

Cornerstone Compression

In order to reduce the number of cornerstone cases that must be stored in a knowledge base, the present system is arranged such that when a new node is added to the system with a conclusion which is a refinement of an output conclusion, instead of adding the input case as a cornerstone case for the new node, the system checks to see whether an existing stored cornerstone case would satisfy the new node. If such a cornerstone case exists, it is associated with the new node.

It will be understood that by reusing existing cases in this way, the manageability of the knowledge base is improved.

Duplicate Conclusion RDR

An example of an MC-RDR knowledge based system in accordance with an embodiment of the present invention will now be described with reference to the above-described case A, which has the following attributes Glucose type=fasting Past (glucose)=10

Past (glucose type)=timed

HcAlc=11

When the case is presented to a medical-type MC-RDR system, instead of returning three identical conclusions, the system returns a single conclusion "diabetic" together with the justification for this conclusion. The system also indicates that there are actually 3 nodes in the system which have been executed to give this conclusion.

Each conclusion is returned for different reasons, as follows:

Conclusion 1 "diabetes"

Justifications: glucose greater than 8 and glucose type= fasting.

Conclusion 2 "diabetes"

Justifications: past (glucose) greater than 8 and past (glucose type)=timed

Conclusion 3 "diabetes"

Justification: HcAlc greater than 10

However, as described above, the person associated with this case is also pregnant and the correct conclusion should be "gestational diabetes".

To modify the returned conclusion "diabetes", the user selects the single returned conclusion for modification and enters the alternative desired conclusion "gestational diabetes". The system accumulates all of the cornerstone cases, which are liable to have a conclusion affected by this change, and compiles a cornerstone conflict list. It will be understood that the cornerstone conflict list will include cornerstone conflicts derived from each of the three nodes giving the conclusion "diabetes". The user is then required to either indicate that selected cornerstone cases in the cornerstone conflict list should have the new conclusion, or differentiate selected cornerstone cases in the cornerstone conflict list from the new case by specifying a distinguishing condition or conditions. Once the condition or conditions has/have been entered, the system makes a copy of the condition or conditions for each node associated with the returned conclusion. Of course, each node associated with the returned conclusion is provided with a child node corresponding to the new modified conclusion.

Figure 11:
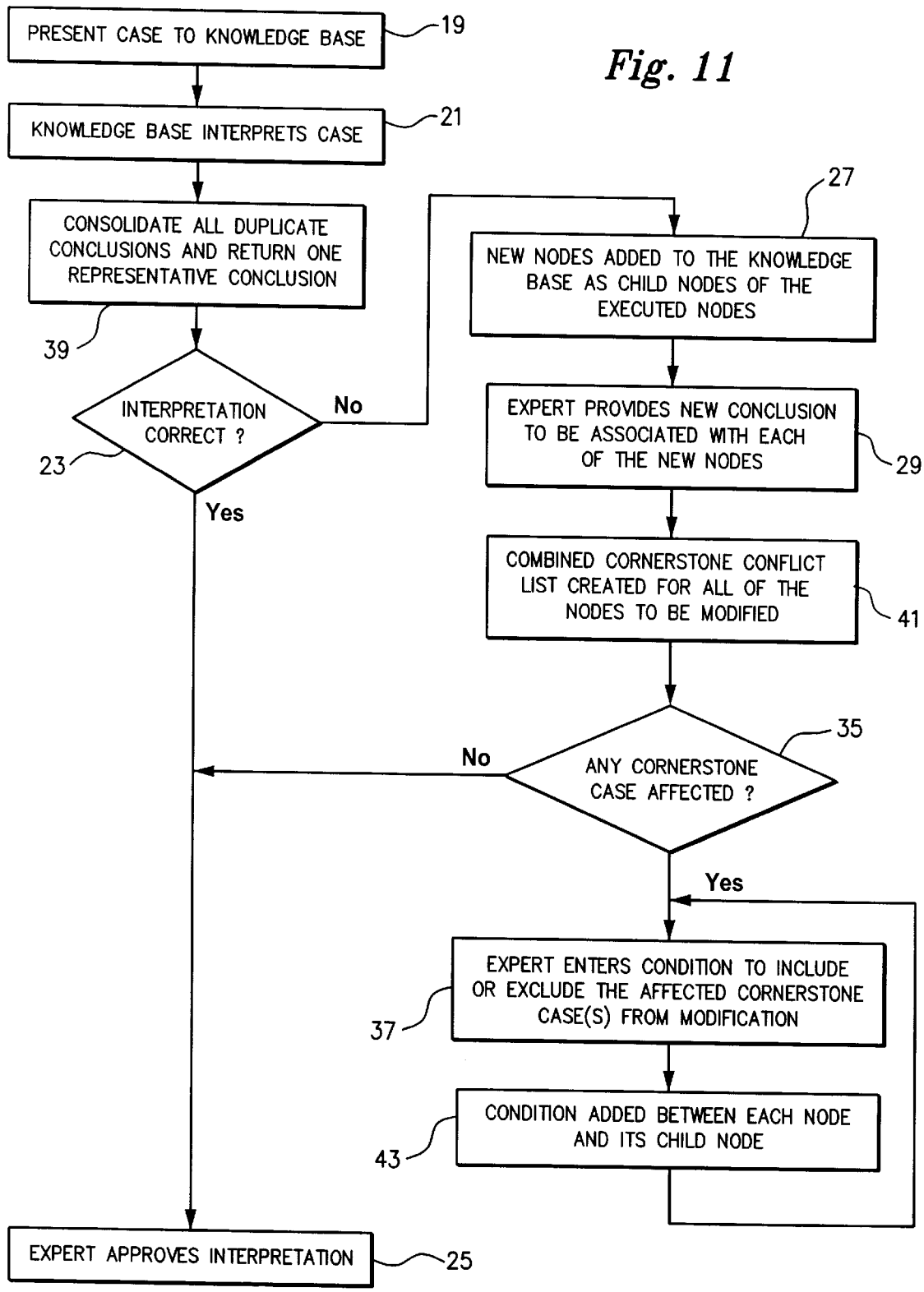
FIG. 11 is a flow diagram showing operation of a multiple classification RDR knowledge based system in accordance with an embodiment of the present invention.

A flow diagram showing a method of construction of the above described embodiment of a knowledge based system is shown in FIG. 11. Like steps are identified with like reference numbers. The method further includes the steps of consolidating all duplicate conclusions and outputting one conclusion 39 after the step of interpreting the case 21, creating a cornerstone conflict list for all of the nodes to be modified 41 after the step of providing a new conclusion for the added node 29, and adding an entered condition to each node to be modified 43.

It will be understood that this aspect of the present invention allows multiple duplicate conclusions to be simultaneously modified quickly and easily by a user.

In addition, since the user is forced to enter a justification for the difference between the present case and the cornerstone cases in the cornerstone conflict list which are to be excluded from having the new conclusion, the user is forced to be very specific about the types of conditions under which the change should occur. This is beneficial since multiple duplicate conclusions generally arise from deep in the tree and by providing specific conditions it can be expected that these nodes will be less frequently visited, and therefore have less opportunity to be corrected.

While this approach to dealing with multiple duplicate conclusions is simpler and less time consuming for a user than the prior art approach to dealing with multiple duplicate conclusions, it is still necessary for a user to review all cornerstone conflict cases for all of the duplicate conclusion nodes of the case under consideration.

As an alternative to the above-described improvement, the following second embodiment of the present invention is provided.

Figure 12:
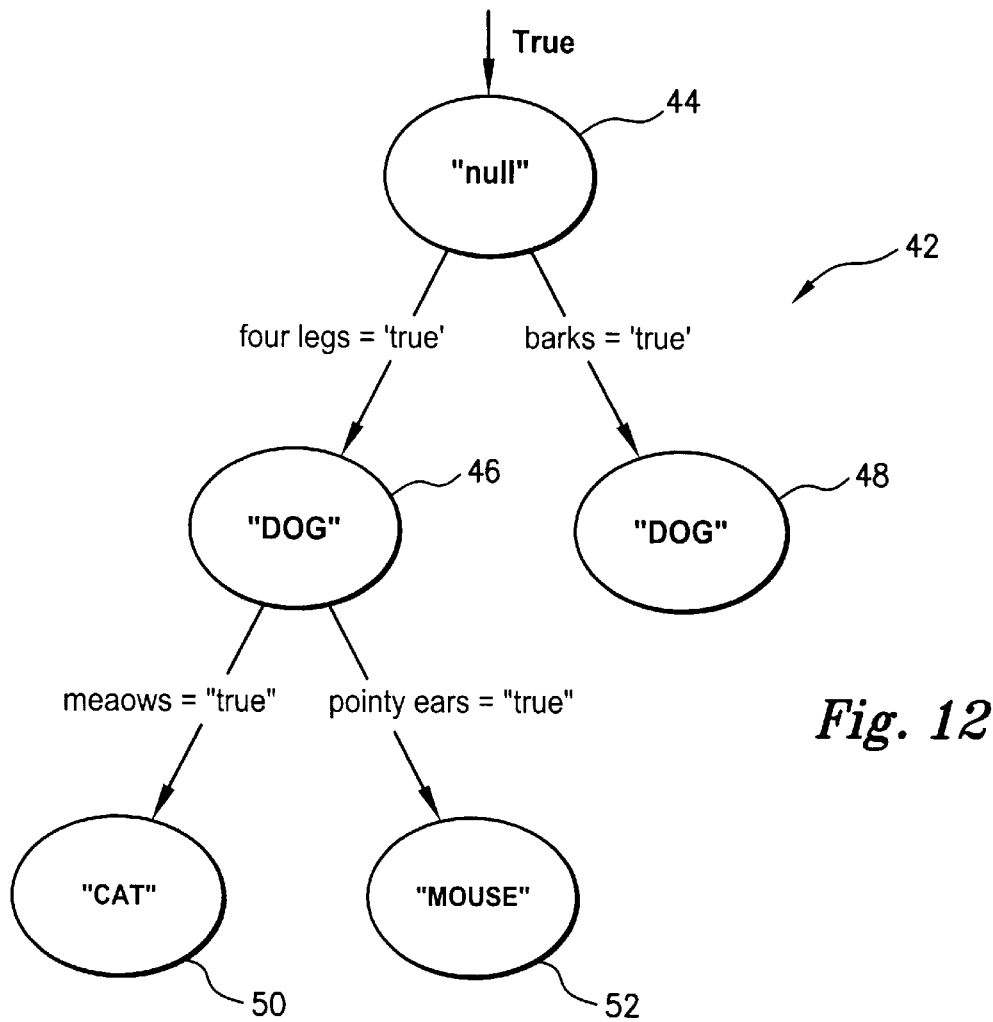
FIG. 12 is a diagrammatic representation of an alternative embodiment of a multiple classification RDR system in accordance with the present invention.

Referring to FIG. 12, there is shown a multiple classification RDR knowledge based system 42 which includes a "null" first node 44, a second node 46 associated with the conclusion "dog", a third node 48 associated with the conclusion "dog", a fourth node 50 associated with the conclusion "cat" and a fifth node 52 associated with the conclusion "mouse".

With a conventional MC-RDR knowledge based system, a case having the attributes "four legs" and "barks" would return a conclusion "dog" from the second node 46 and the conclusion "dog" from the third node 48. Also, a case having the attributes "four legs", "barks" and "pointy ears" would return the conclusions "dog" from the third node 48 and the conclusion "mouse" from the fifth node 52.

With the present embodiment of the invention, the system is organised with the aim of ensuring that all conclusions for a given case are unique. This is achieved by configuring the system such that if a node associated with a given conclusion is satisfied, no other node that is associated with the same conclusion and that is satisfied should be executed.

With the above first example, therefore, the first case presented to the system shown in FIG. 12 would only return the conclusion "dog" from the second node 46. The conclusion "dog" associated with the third node 48 is not returned since the second node 46 giving the same conclusion has already been satisfied by the case.

With the above second example, only the conclusion "mouse" is returned from the fifth node 52. The conclusion "dog" from the third node 48 is not returned since the second node 46 associated with the same conclusion "dog" has already been satisfied.

It will be understood that with this aspect of the invention, it is not necessary for a node to be executed and therefore a conclusion to be returned in order to serve to restrict return of an identical conclusion. It is only necessary that the node is satisfied, that is all rules between the node and the "null" node are satisfied.

With this system, to ensure satisfactory operation a restriction is imposed on the user in that each conclusion added by the user must not be excluded by any other conclusions for the case. A new conclusion must also not lead to any new mutual conclusions that would exclude other cases.

Alternatively, the system may be configured such that exclusivity is enforced on the system as it is constructed. This is ensured by incorporating additional conditions to force only one version of a conclusion to be valid at any given time.

Figure 13:
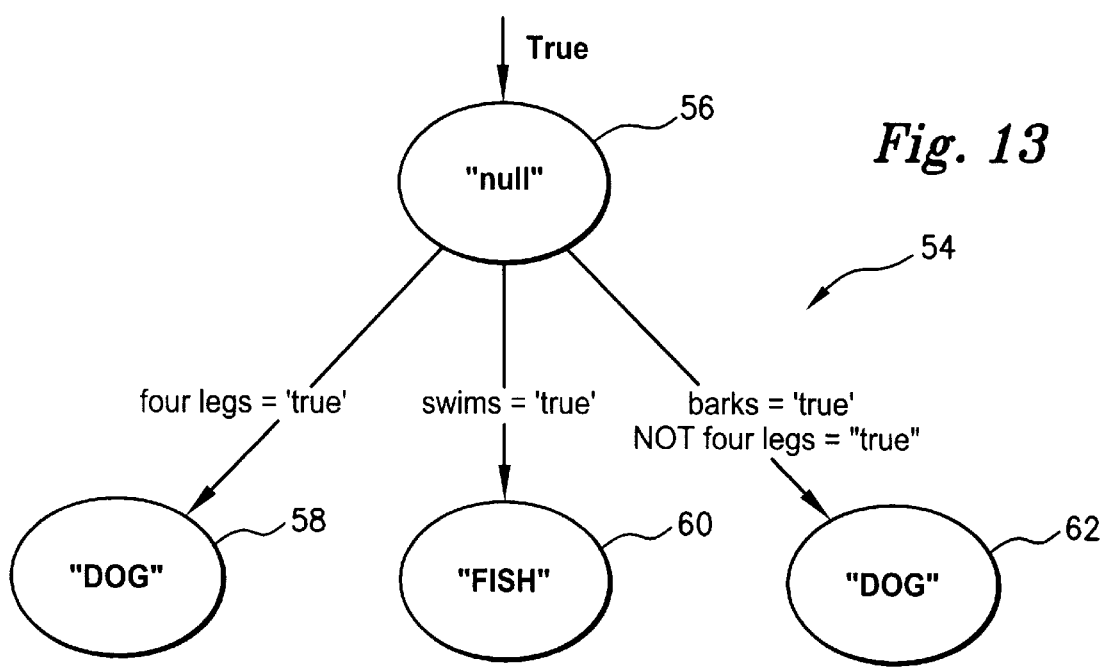
FIGS. 13 and 14 are diagrammatic representations of a further alternative embodiment of a multiple classification RDR knowledge based system in accordance with of the present invention.
Figure 14:
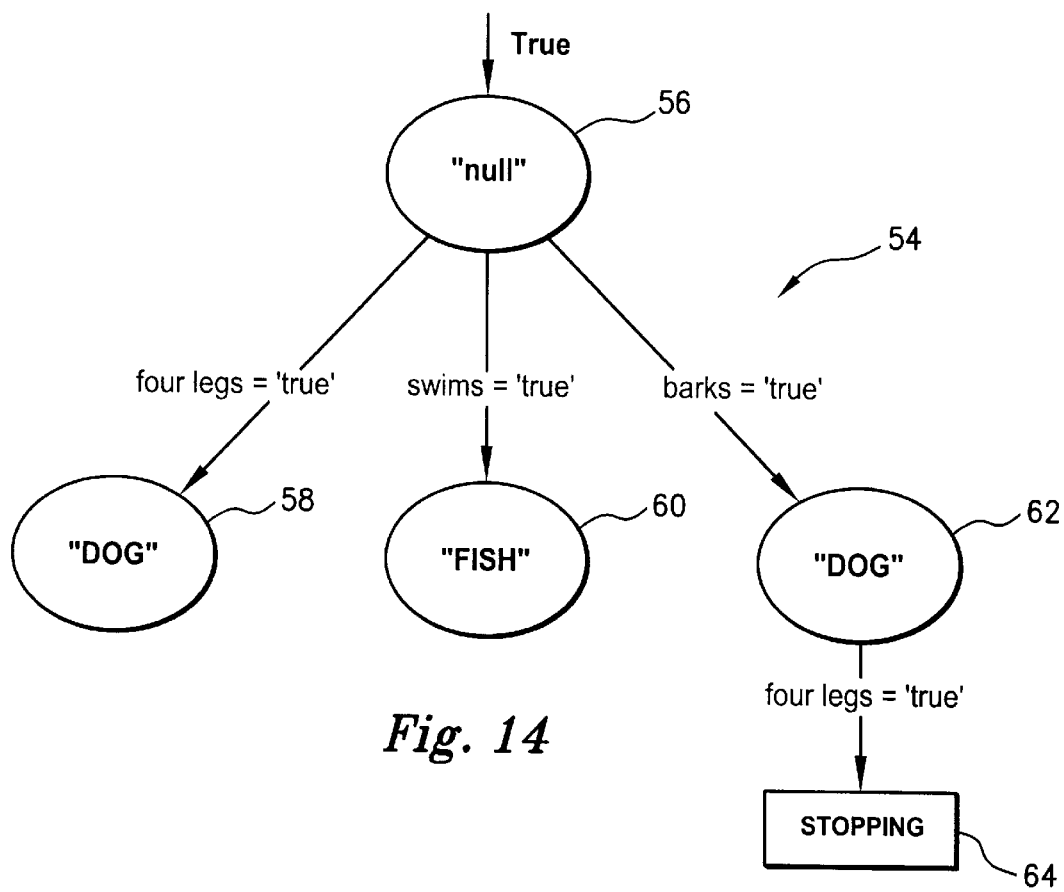

FIGS. 13 and 14 illustrate a knowledge based system in accordance with a third embodiment of the present invention.

FIG. 13 shows an MC-RDR knowledge based system 54 which includes a "null" first node 56, a second node 58 having an associated conclusion "dog", a third node 60 having an associated conclusion "fish" and fourth node 62 having an associated conclusion "dog".

With this system 40, the fourth node 62 has been added to cover the notion of a three legged dog. In order to prevent the second node 58 and the fourth node 62 from being executed at the same time, the condition "not four legs=true" has been added to the link between the "null" node 56 and the fourth node 62. In this way, when the second node 58 is satisfied, the fourth node 62 will not be satisfied and vice versa, and as a consequence only one conclusion "dog" can be returned for a given case.

While this configuration is satisfactory, it could lead to a structure which includes very messy rules as each rule would include negated conditions for all nodes giving the same conclusion.

To alleviate this problem, instead of adding a negated condition to the link, a stopping node 64 as shown in FIG. 14 could be added as a child node of the fourth node 62. In this way, when the second node 58 is satisfied because the presented case has the attribute "four legs", the fourth node 62 will not be executed since its child stopping node 64 is executed.

Dependency Ordered Execution

A further aspect of the present invention will now be described with reference to FIGS. 15 and 16.

To improve on known MC-RDR systems having intermediate conclusions, a system is provided wherein the execution order of the nodes of the knowledge base is separated entirely from the structure of the knowledge base. Instead, the nodes are executed in an order which best suits the dependencies between the conclusions and the intermediate conclusions. The system is also arranged so that the user cannot add rules leading to cycles of dependency between different conclusions.

Figure 15:
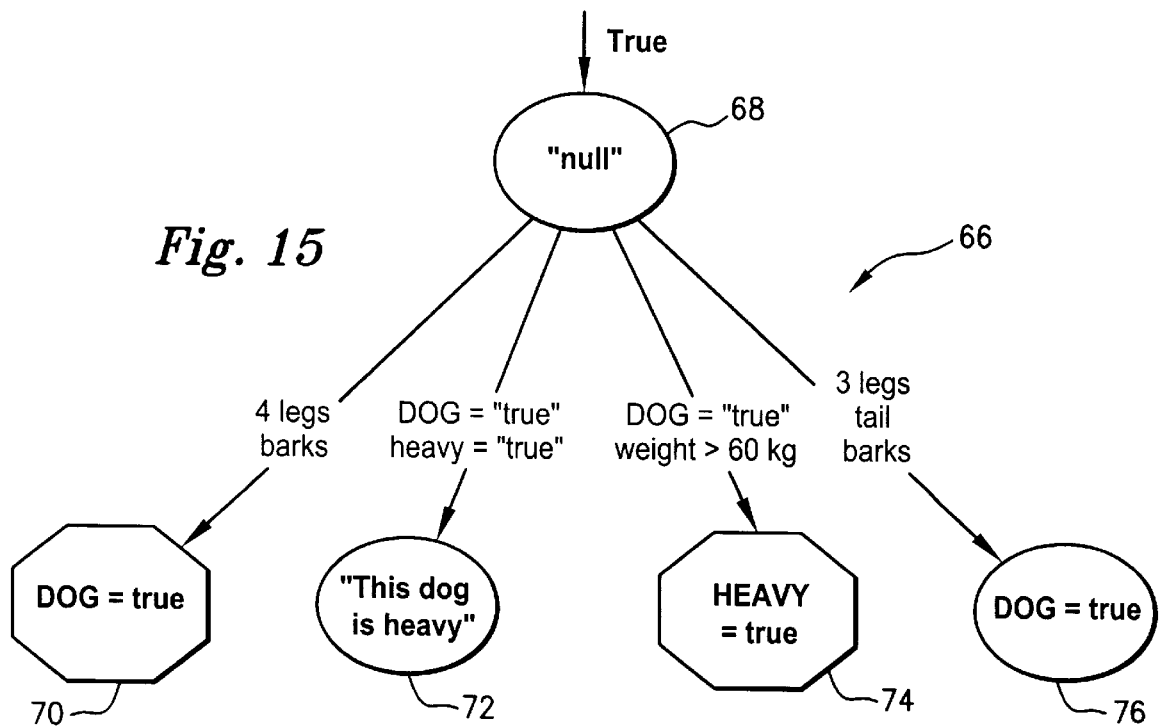
FIG. 15 is a diagrammatic representation of a multiple classification RDR system in accordance with the present invention.

Referring to FIG. 15, there is shown an MC-RDR knowledge based system 66 which includes a "null" first node 68, an intermediate node 70 having an associated conclusion "dog=true", a second node 72 having an associated conclusion "this dog is heavy", a third node 74 having an associated conclusion s "heavy=true" and a fourth node 76 having an associated conclusion "dog=true".

With a conventional MC-RDR system, when a case having the attributes "four legs", "barks" and "weight=70 kgs" is presented to the knowledge base, after a first iteration a conclusion "dog=true" is returned.

After a second iteration, the system returns "dog=true" and "heavy=true".

After a third iteration, the system returns the conclusions "dog=true", "heavy=true" and "this dog is heavy".

It can be seen from this example that with a conventional MC-RDR system having an intermediate conclusion, it is necessary for three iterations to be carried out in order to obtain the correct conclusion "this dog is heavy".

With the present MC-RDR system, the order of execution of the nodes is reordered so that the intermediate node 70 and the fourth node 76 which could set the conclusion "dog=true" are tested before the second and third nodes 72 and 74 which both rely on the conclusion "dog=true". In addition, the system is configured so that the third node 74 which could set that the conclusion "heavy=true" is tested before the second node 72 which relies on the conclusion "heavy=true".

By arranging the execution order in this way, intermediates can be nested within the knowledge base without excessive impact on the running time, and each node of the knowledge base need only be interpreted once.

Figure 16:
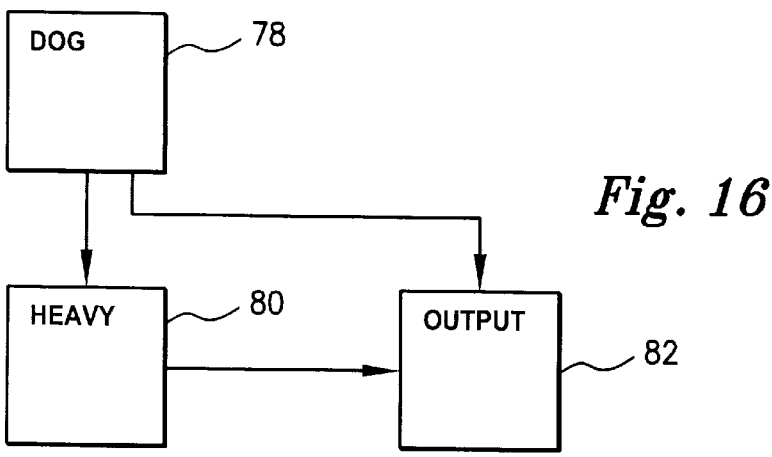
FIG. 16 is a diagrammatic representation of a directed dependency graph of the system shown in FIG. 15.

The desired execution order of the nodes of the knowledge base is maintained by creating a directed graph of dependencies, which in this example is as shown in FIG. 16 which is a representation of the order of execution of nodes in the knowledge base. In this example, all nodes which can set the conclusion "dog" must be tested before all nodes 80 which can set the conclusion "heavy", and all nodes 80 which can set the conclusion "heavy" must be tested before all nodes 82 which can set the output.

Re-ordering of the order of execution may be achieved by either physically re-structuring the tree, so that the desired dependency order matches conventional RDR depth first execution or, alternatively, by maintaining an alternative structure and permitting individual nodes to be addressed according to the order in the dependency directed graph.

It will be understood that the dependency graph must include a restriction in that the graph should have no cycles of dependency between different conclusions, with the exception that an intermediate node may be altered by itself. This ensures that each node in the knowledge base need only be executed once to obtain a consistent result.

It will also be understood that although the execution order of sibling nodes at the same level may be altered, when a particular node is tested, all parents of that node are also tested and all children of that node are also tested.

In addition, it will be understood that where multiple nodes setting a given conclusion exist, the system may be arranged such that the nodes are tested in the order in which the nodes were added to the knowledge base. This ensures that operation of the knowledge base is predictable for users.

Node/Conclusion Independence

With conventional MC-RDR systems, each node of the knowledge base is associated with a particular conclusion, with the conclusion being a modification of the conclusion associated with its parent node.

A further aspect of the present invention is that the system is configured such that as well as being associated with a conclusion, each node may be associated with an action such as "send an email", "set a value in the data base", "remove values from a given conclusion", "do not remove parent conclusion but, instead, add an additional conclusion", "amalgamate a set of conclusions by removing old values and adding new values" or "set multiple conclusions at a single node".

With this approach to the knowledge base, previous known RDR systems could be emulated by carrying out the following actions when a node is executed:

1. Remove the erroneous conclusion
2. Add a new conclusion

The major effect of this is to allow users to manipulate combinations of conclusions within the tree.

For example, given the conclusions "this is a dog" and "overweight animal", a node when executed can be caused to remove both of these conclusions and return a conclusion "this is an overweight dog".

It will be understood that with this type of system each conclusion will depend only on the actions associated with the executed nodes. As a consequence, for example, there is no need to include a stopping node as a child node of a conclusion to be removed. Instead, an action which has the effect of removing the conclusion associated with the node may be used. This allows the knowledge base to be constructed in a more optimal way.

Direct Editing of RDR Systems

A further aspect of the present knowledge based system includes means for facilitating direct editing of conclusions, conditions, and rules of the knowledge base.

In order to change a conclusion, condition or rule used in the knowledge base directly, the user first selects the appropriate conclusion, condition or rule to amend and enters a replacement for the selected conclusion, condition or rule. As a consequence, the system collates all cornerstone cases in the knowledge base that would be affected by the change and compiles a cornerstone conflict list of all the affected cornerstone cases. For each cornerstone case in the conflict list the user must either indicate that the changed conclusion, condition or rule is to apply to that cornerstone case, or add conditions so that the cornerstone case is no longer affected by the change. The changed conclusion, condition or rule is then added to the knowledge base in conjunction with any additional conditions that are added to exclude specific cornerstone cases in the cornerstone conflict list.

For example, to edit a conclusion the user is presented with a list of all existing conclusions in the knowledge base. The user selects one conclusion such as "this is a dog" and choses a new amended conclusion such as this is an over-weight dog". The system then collates all cornerstone cases that are affected by this change of conclusion and each cornerstone case in the conflict list is then either accepted for change or excluded from change by adding a condition.

This allows the knowledge base to be accessed and edited directly from a number of different perspectives, that is, from a rule-based view, a condition-based view, a conclusion-based view, or a case-based view.

Reduced Expert Supervision

A further aspect of the present RDR knowledge base system relates to reducing the degree of expert supervision required.

Auto-Validation

In order to provide a user with a knowledge based system which requires reduced expert supervision, the expert is permitted to view statistics on a conclusion or a set of conclusions previously returned by the system. Such statistics may include the number of times a particular conclusion or a set of conclusions has been returned, and the number of times the conclusion or conclusions returned was/were incorrect and as a consequence was/were altered by the user.

On the basis of this information, the user may then choose a percentage value indicative of the proportion of subsequent input cases which should be presented to the domain expert for verification.

Prudence

As discussed above, "prudence" profiles have been used in known RDR systems for detecting when a case is likely to be an exception.

With the prior art, all attributes of cornerstone cases are used for the features to be tracked in each profile. With the present invention, functions which permit values from one or more attribute of a case to be combined, and intermediate conclusions may also be used in each profile.

The prudence profile may also include an indication which will be referred to as "profile maturity" wherein an input case is flagged as requiring verification until the profile has reached a degree of "maturity".

In other words, the conclusion returned in response to an input case will be flagged for verification until the profile associated with the returned conclusion has encountered a predetermined number of input cases.

Figure 17:
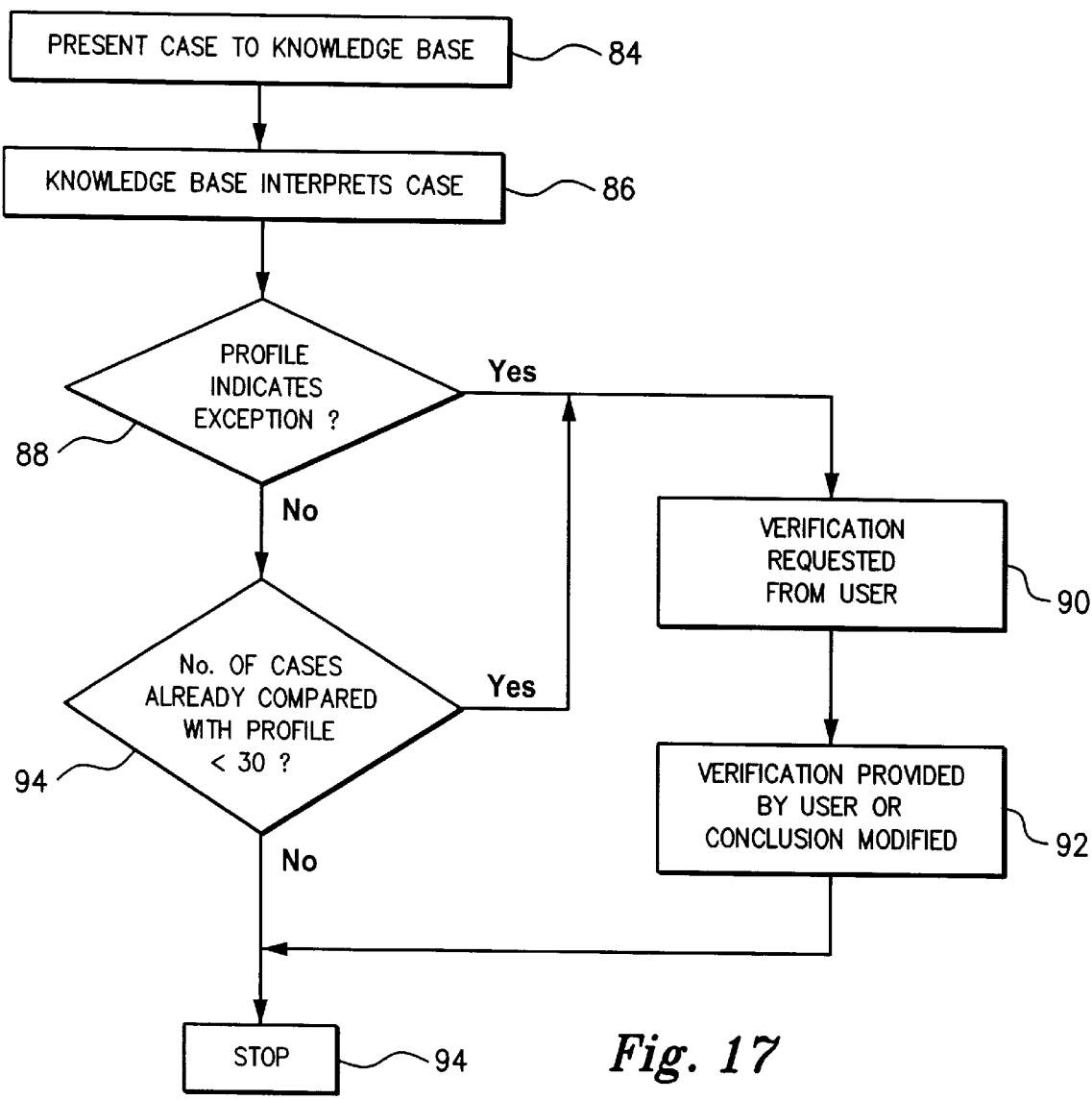
FIG. 17 is a flow diagram showing operation of a first aspect of prudence maturity of a multiple classification RDR system in accordance with the present invention.

An example of this aspect of profile maturity is shown in the flow diagram in FIG. 17. With this example, a case is presented to the knowledge base at 84, the knowledge base interprets the case 86 and a decision is made at 88 as to whether the profile indicates an exception. If an exception is identified, verification 90 is required from the user and if necessary the conclusion is modified. If an exception is not identified, a determination is made at 94 as to whether the number of cases already compared with the profile is less than a predetermined amount, in this example 30. If it is, then steps 90 and 92 are followed. If it is not, then the prudence algorithm stops 94.

Figure 18:
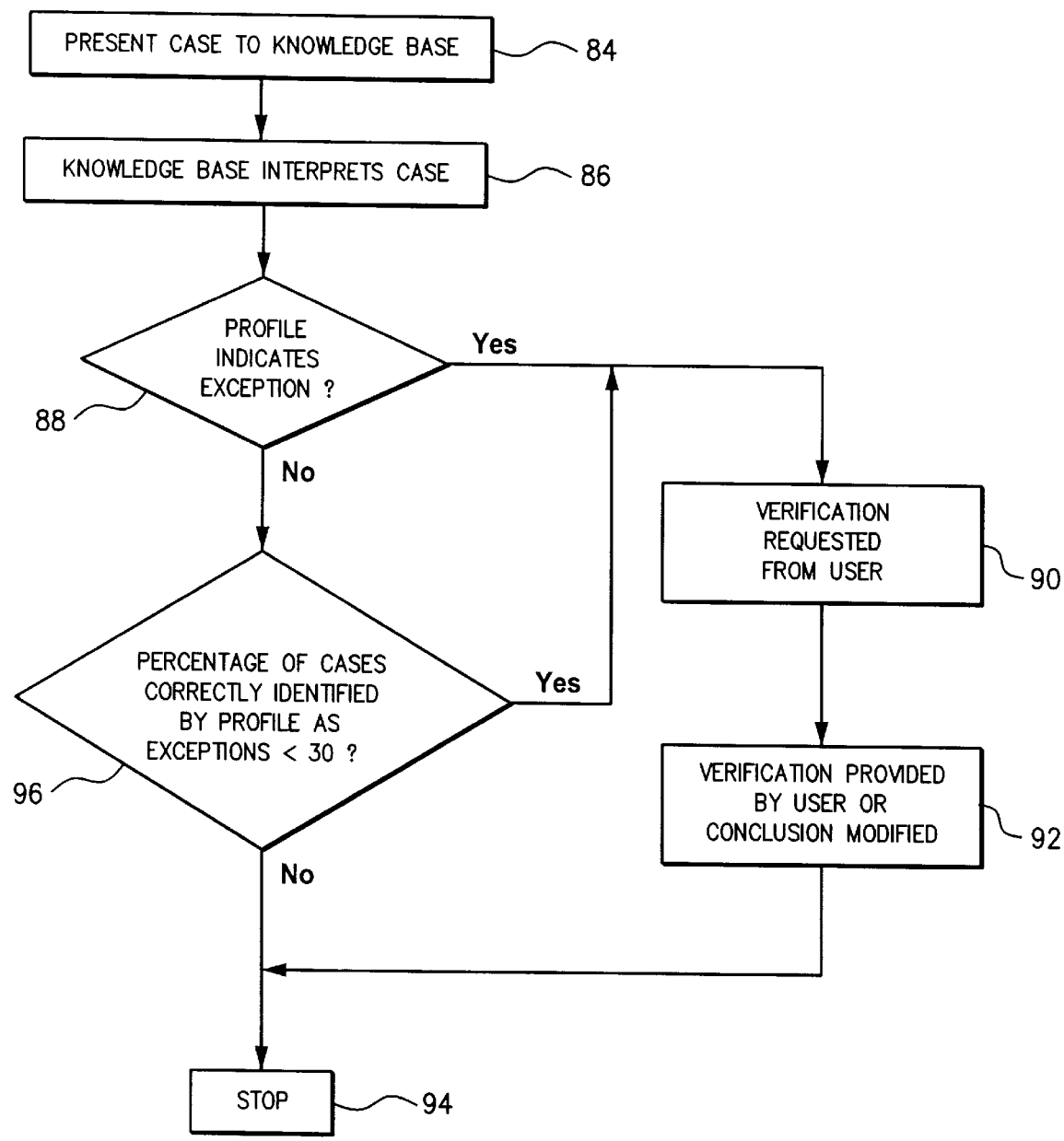
FIG. 18 is a flow diagram showing operation of a second aspect of prudence maturity of a multiple classification RDR system in accordance with the present invention.

Alternatively, or in addition, a profile may only be considered mature if it has reached a predetermined level of accuracy. An example of this aspect of profile maturity is shown in the flow diagram in FIG. 18. Like or similar steps are indicated with like reference numerals. With this example, instead of determining whether the profile has been compared with a predetermined number of cases, the percentage of cases correctly identified by the profile as exceptions is compared at 96 with a predetermined value.

The features of the prudence profile may also be selectable by a user so that not all attributes of a cornerstone case associated with a conclusion are used to determine a prudence profile. This serves to reduce the number of cases and therefore the time required to obtain an acceptable level of error.

Instead of generating a yes/no prudence flag for each conclusion returned by the system, a series of prudence ratings may be generated based on the following properties:

proportion by which prior range has been exceeded "R";

proportion of times that the profile has correctly identified an exception "E";

proportion of relevant profiles that flag the given exception "Q"; and/or number of times that a profile has been updated "N".

These values may be combined according to the particular domain or application under consideration. For example, the values may be combined using the formula:

$$aQ\sum_{i=1}^{i=n}(bR_i + cE_i + dN_i)$$

In addition to the above, the system may be arranged such that the prudence profiles associated with a conclusion are reset to zero maturity when a user has changed the conclusion even though the prudence profile did not indicate that the case was an exception.

The system may also be arranged such that the profile is based on individual nodes, on the combination of nodes associated with a set of output conclusions, on an individual conclusion, or on the set of conclusions output by the system.

The system may also output user queries such as "has the scope of the knowledge base changed?" or "the knowledge base did not predict that change. Is there some combination of attributes that should be better tracked by the knowledge base?".

In the former instance, the user is invited to identify any other conclusions or conditions that are also expected to change as a result of the change in scope of the knowledge base. In the latter instance, the user is given the option of selecting one or more attributes or a function of attributes that should be available in future for construction of the knowledge base. The selected attribute or function is added as a feature to all prudence profiles. In addition, if a function is selected, it is made available to the user for future use in rule building.

The missed change of conclusion can also be used as an indication that the user is having difficulty specifying the domain appropriately. The system can then directly contact the knowledge expert to suggest that the domain expert should be assisted.

In situations where the prudence profiles do not warn of an exception, additional remedial steps may be taken. For example, when a new conclusion and associated rule are added as a result of output of an incorrect conclusion, the system may investigate the added conditions of the rule.

If a single attribute is referred to in the conditions, the user is queried about the incorrect conclusion so as to establish whether values that were previously acceptable for the conclusion are no longer acceptable. If the user answers in the affirmative, the system may act to delete the range associated with the attribute. Alternatively, the system may cause the range to be reset for that attribute in all prudence profiles which are associated with the attribute.

If more than one attribute is included in the conditions, the fact that the user has indicated an incorrect conclusion is suggestive that these attributes are important in combination. Depending on the types of conditions used, the system then creates a dummy attribute based on the combination of attributes in an attempt to capture the important function.

For example, if the new rule contains the following conditions:

a>7 b<7 the dummy attribute may be generated on the basis of a subtractive relationship such as a−b.

Alternatively, if the new rule contains the following conditions:

a>7 b<5

The dummy attribute may be generated on the basis of an additive relationship such as a+b.

Such a relationship is implemented by normalising each attribute so that the values are measured relative to standard deviations from the mean for that attribute. For example, for an attribute a, the normalisation of a is defined as follows;

$Z(a)=(a-\text{mean}(a))/SD(a)$ where SD(a) is the standard deviation of attribute a.

In subsequent circumstances where the dummy attribute is instrumental in identifying an input case which is likely to be an exception, the combination of attributes represented by the dummy attribute is confirmed by the system as being important.

It will be understood that the prudence ratings/flags may be used in combination with auto-validation to select and order the cases presented to the user for verification. The idea is that the cases most likely to be exceptions are verified first. Further, when auto-validation is used, it will be understood that the cases that are automatically verified are those with the least likelihood of being exception.

It will also be understood that verification of a conclusion or conclusions may be separated from knowledge building. In this way, the system may allow a set of conclusions to be output and forwarded to a desired destination immediately after an interpretation has been changed, and the knowledge building stage to occur at some time later.

Where methods and apparatus of the present invention may be implemented by software applications, or partly implemented by software, then they may take the form of program code stored or available from computer readable media, such as CD-ROMS or any other machine readable media, the program code comprising instructions which, when loaded onto a machine such as a computer, the machine then becomes an apparatus for carrying out the invention. The computer readable media may include transmission media, such as cabling, fibre optics or any other form of transmission media.

It will be understood that the invention is applicable to various situations where it is desirable to generate an output based on a series of attributes such as, for example, to pathology where it is desired to generate diagnoses on the basis of test results or symptoms.

It will be appreciated to persons skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when multiple identical conclusions are returned by the system in response to an input case and a new conclusion associated with the input case is added as a refinement of said identical conclusions, a list of cornerstone conflict cases associated with all of said identical conclusions is generated, and said system being arranged to receive an input rule indicative of a difference between the input case and the cornerstone conflict cases, and to associate the input rule with each of said identical conclusions.

2. A system as claimed in claim 1, wherein the multiple identical conclusions are displayed as a single conclusion with an indication of the number of identical conclusions returned by the system.

3. A system as claimed in claim 1, wherein the knowledge base is organised such that the knowledge base may be represented in the form of a tree having a plurality of interconnected nodes, each node of the tree corresponding to a conclusion.

4. A method of constructing a ripple down rules knowledge based system for generating an output conclusion in response to an input case, said method including the steps of providing a database arranged to receive and store a plurality of conclusions and a plurality of rules, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, arranging said system such that when multiple identical conclusions are returned by the system in response to an input case and a new conclusion associated with the input case is added as a refinement of said identical conclusions, a list of cornerstone conflict cases associated with all of said identical conclusions is generated, arranging said system to receive an input rule indicative of a difference between the input case and the cornerstone conflict cases, and associating the input rule with each of said identical conclusions.

5. A method as claimed in claim 4, further including the step of displaying the multiple conclusions as a single conclusion with an indication of the number of identical conclusions returned by the system.

6. A computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when multiple identical conclusions are returned by the system in response to an input case and a new conclusion associated with the input case is added as a refinement of said identical conclusions, a list of cornerstone conflict cases associated with all of said identical conclusions is generated, and said system being arranged to receive an input rule indicative of a difference between the input case and the cornerstone conflict cases, and to associate the input rule with each of said identical conclusions.

7. A ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when a new conclusion identical with a previous conclusion is added to the database, simultaneous output of the new conclusion and the previous conclusion is restricted.

8. A system as claimed in claim 7, wherein said system is arranged to restrict simultaneous output of the new conclusion and the previous conclusion by identifying a previous conclusion and verifying whether the rule associated with the identified previous conclusion is satisfied by the input case.

9. A system as claimed in claim 7, wherein said system is arranged to restrict simultaneous output of the new conclusion and the previous conclusion by identifying a previous conclusion, identifying a rule associated with the previous conclusion, generating a negated rule corresponding to said identified rule, and associated said negated rule with the new conclusion.

10. A system as claimed in claim 9, wherein said system is arranged to generate a stopping conclusion, the stopping conclusion being associated with the new conclusion and with a negated rule of said identified rule, the arrangement being such that when the previous conclusion is output, the stopping conclusion is satisfied and the new conclusion is not output.

11. A method of constructing a ripple down rules knowledge based system for generating an output conclusion in response to an input case, said method including the steps of providing a database arranged to receive and store a plurality of conclusions and a plurality of rules, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, and arranging said system such that when a new conclusion identical with a previous conclusion is added to the database, simultaneous return of the new conclusion and the previous conclusion is restricted.

12. A method as claimed in claim 11, wherein said arranging step includes the steps of identifying a previous conclusion and verifying whether the rule associated with the identified previous conclusion is satisfied by the input case.

13. A method as claimed in claim 11, wherein said arranging step includes the steps of identifying a previous conclusion, identifying a rule associated with the previous conclusion, generating a negated rule corresponding to said identifying rule, and associating said negated rule with the new conclusion.

14. A method as claimed in claim 13, wherein said arranging step further includes the steps of generating a stopping conclusion, and associating the stopping conclusion with the new conclusion and with a negated rule of said identified rule, the arrangement being such that when the previous conclusion is output, the stopping conclusion is satisfied and the new conclusion is not output.

15. A computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when a new conclusion identical with a previous conclusion is added to the database, simultaneous return of the new conclusion and the previous conclusion is restricted.

16. A ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, and determining means for determining a preferred order of execution of rules of the database.

17. A system as claimed in claim 16, wherein the determining means includes a dependency ordered graph of the dependency relationship between previously stored conclusions.

18. A system as claimed in claim 16, wherein cycles of dependency between different previously stored conclusions and any new rules is restricted.

19. A system as claimed in claim 16, further including means for reorganising the structure of the knowledge base in accordance with said determined preferred order of execution of rules in the database.

20. A method of constructing a ripple down rules knowledge based system for generating an output conclusion in response to an input case, said method including the steps of providing a database arranged to receive and store a plurality of conclusions and a plurality of rules, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, and determining a preferred order of execution of rules of the database.

21. A method as claimed in claim 20, wherein said determining step includes the step of generating a dependency ordered graph of the of the dependency relationship between previously stored conclusions.

22. A method as claimed in claim 20, wherein said determining step includes the step of restricting cycles of dependency between different previously stored conclusions and any new rules.

23. A method as claimed in claim 20, further including the step of reorganising the structure of the knowledge base in accordance with said determined preferred order of execution of rules of the database.

24. A computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, and means for determining a preferred order of execution of rules of the database.

25. A ripple down rules knowledge based system for carrying out an action in response to an input case, said system including a database arranged to receive and store a plurality of action instructions and a plurality of rules, each new action instruction which is added to the database being associated with a previously stored action instruction as a refinement of the previously stored action instruction and each new action instruction which is added to the database being associated with a rule, input means for facilitating input of a case, and implementation means for carrying out an action corresponding to an action instruction when said corresponding action instruction is returned by the system in response to an input case.

26. A system as claimed in claim 25, wherein an action instruction corresponds to an action such as sending an e-mail, setting a value in the database, removing a value from a conclusions, not removing a conclusion but, instead, adding another conclusion, amalgamating a set of conclusions or setting multiple conclusions.

27. A method of constructing a ripple down rules knowledge based system for carrying out an action in response to an input case, said method including the steps of providing a database arranged to receive and store a plurality of action instructions and a plurality of rules, associating each new action instruction which is added to the database with a previously stored action instruction as a refinement of the previously stored action instruction, associating each new action instruction which is added to the database with a rule, providing input means for facilitating input of a case, and implementing an action corresponding to an action instruction when said corresponding action instruction is returned by the system in response to an input case.

28. A computer usable medium having computer readable program code embodied therein for causing a computer to operate in accordance with a ripple down rules knowledge based system for carrying out an action in response to an input case, said system including a database arranged to receive and store a plurality of action instructions and a plurality of rules, each new action instruction which is added to the database being associated with a previously stored action instruction as a refinement of the previously stored action instruction and each new action instruction which is added to the database being associated with a rule, input means for facilitating input of a case, and implementation means for carrying out an action corresponding to an action instruction when said corresponding action instruction is returned by the system in response to an input case.

29. A knowledge based system for generating an output conclusion in response to an input case, said system including a database arranged to receive and store a plurality of conclusions and a plurality of rules, each rule having at least one condition, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, and means for facilitating direct editing by a user of conclusions, rules and conditions stored in the database, said system being arranged such that when a conclusion, rule or condition is changed by a user, a list of cornerstone conflict cases affected by the changed conclusion, rule or condition is generated, and said system being arranged to receive at least one input rule to distinguish between cornerstone cases in relation to which the change should apply and cornerstone cases in relation to which the change should not apply.

30. A method of constructing a knowledge based system for generating an output conclusion in response to an input case, said method including the steps of providing a database arranged to receive and store a plurality of conclusions and a plurality of rules, each rule having at least one condition, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, facilitating direct editing by a user of conclusions, rules and conditions stored in the database, arranging said system such that when a conclusion, rule or condition is changed by a user, a list of cornerstone conflict cases affected by the changed conclusion, rule or condition is generated, and arranging said system to receive at least one input rule to distinguish between cornerstone cases in relation to which the change should apply and cornerstone cases in relation to which the change should not apply.

31. A computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each rule having at least one condition, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, and means for facilitating direct editing by a user of conclusions, rules and conditions stored in the database, said system being arranged such that when a conclusion, rule or condition is changed by a user, a list of cornerstone conflict cases affected by the changed conclusion, rule or condition is generated, and said system being arranged to receive at least one input rule to distinguish between cornerstone cases in relation to which the change should apply and cornerstone cases in relation to which the change should not apply.

32. A ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to an input case, means for generating a prudence profile, means for generating a prudence identifier using the prudence profile, said prudence identifier being indicative of whether said output previously stored conclusion is likely to be incorrect for the input case, and means for generating a profile maturity value indicative of the likely accuracy of the prudence identifier.

33. A system as claimed in claim 32, wherein the profile maturity value is indicative of the number of cases encountered by the prudence profile.

34. A system as claimed in claim 32, wherein the profile maturity value is indicative of the proportion of cases correctly identified by the prudence profile as resulting in incorrect conclusions.

35. A system as claimed in claim 32, wherein the attributes to be tracked in the prudence profile are selectable by a user.

36. A system as claimed in claim 32, wherein the prudence identifier includes a prudence rating, said prudence rating being based on the proportion by which the range of said prudence profile has been exceeded (R), the proportion of times that the prudence profile has correctly identified an exception (E), the proportion of relevant profiles that flag a given exception (Q), and/or the number of times that a profile has been updated (N).

37. A system as claimed in claim 35, wherein the prudence rating is identified by the formula:

$$aQ\sum_{i=1}^{i=n}(bR_i + cE_i + dN_i).$$

38. As system as claimed in claim 32, wherein the system is arranged such that the prudence profile is based on an individual conclusion or on a set of conclusions output by the system.

39. A system as claimed in claim 32, further including means for resetting the maturity value to zero when a new conclusion is added to the database and the prudence profile did not indicate that the output conclusion was likely to be incorrect.

40. A system as claimed in claim 32, further including resetting means responsive to a user for resetting to zero the prudence profile associated with an attribute of an input case when a new conclusion is added to the database and the rule associated with the new conclusion includes said attribute and no other attribute.

41. A system as claimed in claim 40, wherein the resetting means is arranged to reset to zero all prudence profiles associated with the attribute.

42. A system as claimed in claim 32, further including function generating means for generating a prudence function when a new conclusion is added to the database and the rule associated with the new conclusion includes more than one attribute, the prudence function serving to generate a dummy attribute based on said more than one attribute, said dummy attribute being subsequently used to determine the prudence identifier.

43. A system as claimed in claim 42, wherein the prudence function is a subtractive function or an additive function.

44. A system as claimed in claim 42, wherein each said more than one attribute is normalised.

45. A method of predicting the accuracy of a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to an input case, said method including the steps of generating a prudence profile, generating a prudence identifier using the prudence profile, said prudence identifier being indicative of whether said output previously stored conclusion is likely to be incorrect for the input case, and generating a profile maturity value indicative of the likely accuracy of the prudence identifier.

46. A method as claimed in claim 45, wherein the profile maturity value is indicative of the number of cases encountered by the prudence profile.

47. A method as claimed in claim 45, wherein the profile maturity value is indicative of the proportion of cases correctly identified by the prudence profile as resulting in incorrect conclusions.

48. A method as claimed in claim 45, wherein the attributes to be tracked in the prudence profile are selectable by a user.

49. A method as claimed in claim 45, wherein the prudence identifier includes a prudence rating, said prudence rating being based on the proportion by which the range of said prudence profile has been exceeded (R), the proportion of times that the prudence profile has correctly identified an exception (E), the proportion of relevant profiles that flag a given exception (Q), and/or the number of times that a profile has been updated (N).

50. A method as claimed in claim 49, wherein the prudence rating is identified by the formula:

$$aQ\sum_{i=1}^{i=n}(bR_i + cE_i + dN_i).$$

51. A method as claimed in claim 45, further including the step of arranging the system such that the prudence profile is based on an individual conclusion or on a set of conclusions output by the system.

52. A method as claimed in claim 45, further including the step of resetting the maturity value to zero when a new conclusion is added to the database and the prudence profile did not indicate that the output conclusion was likely to be incorrect.

53. A method as claimed in claim 45, further including the step of resetting to zero the prudence profile associated with an attribute of an input case when a new conclusion is added to the database and the rule associated with the new conclusion includes said attributes and no other attribute.

54. A method as claimed in claim 53, wherein the resetting step includes the step of resetting to zero all prudence profiles associated with the attribute.

55. A method as claimed in claim 45, further including the step of generating a prudence function when a new conclusion is added to the database and the rule associated with the new conclusion includes more than one attribute, the prudence function serving to generate a dummy attribute based on said more than one attribute, said dummy attribute being subsequently used to determine the prudence identifier.

56. A method as claimed in claim 55, wherein the prudence function is a subtractive function or an additive function.

57. A method as claimed in claim 55, wherein each said more than one attribute is normalised.

58. A computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to an input case, means for generating a prudence profile, means for generating a prudence identifier using the prudence profile, said prudence identifier being indicative of whether said output previously stored conclusion is likely to be incorrect for the input case, and means for generating a profile maturity value indicative of the likely accuracy of the prudence identifier.

59. A ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when a conclusion is output by the system in response to an input case and a new conclusion associated with the input case is added as a refinement of the output conclusion, the system determines whether a cornerstone case already exists which would cause output of the new conclusion and associates said determined cornerstone case with the new conclusion.

60. A method of constructing a ripple down rules knowledge based system for generating an output conclusion in response to an input case, said method including the steps of providing a database arranged to receive and store a plurality of conclusions and a plurality of rules, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, and arranging said system such that when a conclusion is output by the system in response to an input case and a new conclusion associated with the input case is added as a refinement of the output conclusion, the system determines whether a cornerstone case already exists which would cause output of the new conclusion and associates said determined cornerstone case with the new conclusion.

61. A computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, and output means for outputting at least one previously stored conclusion in response to the input case, said system being arranged such that when a conclusion is output by the system in response to an input case and a new conclusion associated with the input case is added as a refinement of the output conclusion, the system determines whether a cornerstone case already exists which would cause output of the new conclusion and associates said determined cornerstone case with the new conclusion.

62. A ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, generating means for generating a statistical value indicative of conclusions previously output by said system, and selecting means for selecting a percentage value indicative of the proportion of subsequent input cases to be presented for verification.

63. A system as claimed in claim 62, wherein said statistical value is indicative of the number of times an output conclusion was incorrect.

64. A method of constructing a ripple down rules knowledge based system for generating an output conclusion in response to an input case, said method including the steps of providing a database arranged to receive and store a plurality of conclusions and a plurality of rules, associating each new conclusion added to the database with a previously stored conclusion as a refinement of the previously stored conclusion, associating each new conclusion added to the database with a rule, providing input means for facilitating input of a case, providing output means for outputting at least one previously stored conclusion in response to the input case, generating a statistical value indicative of conclusions previously output by said system, and selecting a percentage value indicative of the proportion of subsequent input cases to be presented for verification.

65. A method as claimed in claim 64, wherein said statistical value is indicative of the number of times an output conclusion was incorrect.

66. A computer usable medium having computer readable program code embodied therein for causing a computer to operate in accordance with a ripple down rules knowledge based system for generating an output conclusion in response to an input case, said system including a database arranged to receive and store a plurality of conclusions and a plurality of rules, each new conclusion added to the database being associated with a previously stored conclusion as a refinement of the previously stored conclusion and each new conclusion added to the database being associated with a rule, input means for facilitating input of a case, output means for outputting at least one previously stored conclusion in response to the input case, generating means for generating a statistical value indicative of conclusions previously output by said system, and selecting means for selecting a percentage value indicative of the proportion of subsequent input cases to be presented for verification.

* * * * *